US011115882B2

(12) United States Patent
Wang et al.

(10) Patent No.: US 11,115,882 B2
(45) Date of Patent: Sep. 7, 2021

(54) DATA TRANSMISSION METHOD, APPARATUS, AND SYSTEM

(71) Applicant: Huawei Technologies Co., Ltd., Shenzhen (CN)

(72) Inventors: Yi Wang, Shanghai (CN); Rui Cai, Shanghai (CN); Chao Zhang, Shanghai (CN); Ying Qian, Shanghai (CN); Huaijie Xue, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 16/579,274

(22) Filed: Sep. 23, 2019

(65) Prior Publication Data
US 2020/0022037 A1 Jan. 16, 2020

Related U.S. Application Data

(63) Continuation of application No. PCT/CN2017/078092, filed on Mar. 24, 2017.

(51) Int. Cl.
*H04W 36/00* (2009.01)
*H04L 5/00* (2006.01)

(52) U.S. Cl.
CPC ....... *H04W 36/0069* (2018.08); *H04L 5/0048* (2013.01); *H04L 5/0057* (2013.01); *H04W 36/0058* (2018.08); *H04W 36/0061* (2013.01)

(58) Field of Classification Search
CPC ......... H04W 36/0069; H04W 36/0058; H04W 36/0061; H04L 5/0048; H04L 5/0057
See application file for complete search history.

(56) References Cited

U.S. PATENT DOCUMENTS

2010/0265874 A1\* 10/2010 Palanki ................. H04L 5/005
370/315
2012/0307868 A1 12/2012 Zhou et al.
(Continued)

FOREIGN PATENT DOCUMENTS

CN 102158449 A 8/2011
CN 102948085 A 2/2013
(Continued)

OTHER PUBLICATIONS

"Preliminary Performance Evaluation of Downlink CoMP with Scenario 2," Agenda Item: 6.3.1.1, Source: CHTTL, HTC, Document for: Discussion, 3GPP TSG RAN WG1 meeting #64, R1-111005, Feb. 21-25, 2011, 4 pages.

*Primary Examiner* — Ricky Q Ngo
*Assistant Examiner* — Stephen N Steiner
(74) *Attorney, Agent, or Firm* — Slater Matsil, LLP

(57) ABSTRACT

A joint transmission (JT) method and apparatus, the method including selecting, by a network device of a serving cell, a JT user equipment and a coordinated neighboring cell of the JT user equipment, sending, by the network device of the serving cell, a JT user equipment request to a network device of the coordinated neighboring cell, scheduling the JT user equipment and sending scheduling information to the network device of the coordinated neighboring cell, and sending, by the network device of the serving cell, a reference signal and data to the JT user equipment according to the scheduling information, where the reference signal sent by the network device to the JT user equipment by the network device of the serving cell is the same as a reference signal sent by the network device of the coordinated neighboring cell of the JT user equipment to the JT user equipment.

20 Claims, 16 Drawing Sheets

(56) References Cited

U.S. PATENT DOCUMENTS

| | | |
|---|---|---|
| 2013/0021925 A1 | 1/2013 | Yin et al. |
| 2013/0089159 A1 | 4/2013 | Liu |
| 2015/0117385 A1 | 4/2015 | Lee et al. |
| 2016/0353458 A1 | 12/2016 | Lee et al. |
| 2017/0187428 A1 | 6/2017 | Guan et al. |
| 2018/0049236 A1* | 2/2018 | Sun ...................... H04L 5/0048 |

FOREIGN PATENT DOCUMENTS

| | | |
|---|---|---|
| CN | 103580739 A | 2/2014 |
| CN | 104244419 A | 12/2014 |
| CN | 105743625 A | 7/2016 |
| JP | 2013197714 A | 9/2013 |
| JP | 2013535140 A | 9/2013 |
| JP | 2014523718 A | 9/2014 |
| JP | 2016136768 A | 7/2016 |
| JP | 2016140114 A | 8/2016 |
| KR | 20150128772 A | 11/2015 |
| WO | 2012020457 A1 | 2/2012 |
| WO | 2014162357 A1 | 10/2014 |
| WO | 2016037586 A1 | 3/2016 |
| WO | 2016084268 A1 | 6/2016 |

\* cited by examiner

DATA TRANSMISSION METHOD, APPARATUS, AND SYSTEM

CROSS-REFERENCE TO RELATED APPLICATIONS

This application is a continuation of International Application No. PCT/CN2017/078092, filed on Mar. 24, 2017, the disclosure of which is hereby incorporated by reference in its entirety.

TECHNICAL FIELD

This application relates to the field of communications technologies, and in particular, to a data joint transmission method, an apparatus, and a system.

BACKGROUND

In a current wireless communications technology, one base station manages one or more cells to provide a wireless communication function for user equipment. For example, FIG. 1 is a schematic diagram of multiple cells managed by one base station. As shown in the figure, the base station A manages a total of three cells: a cell A0, a cell A1, and a cell A2. One cell may have one or more user equipments, and the user equipment in the cell may access to the base station and communicate with the base station. In a cell, a receiving quality and a transmission rate of cell-edge user equipment are lower than those of cell-center user equipment.

SUMMARY

This application provides a joint transmission (JT) method, an apparatus, and a system, so as to improve value of a JT technology.

According to a first aspect, this application provides a JT method, including selecting, by a network device of a serving cell, JT user equipment and a coordinated neighboring cell of the JT user equipment for the serving cell, sending a JT user equipment request to a network device of the coordinated neighboring cell, scheduling the JT user equipment, and sending scheduling information to the network device of the coordinated neighboring cell of the JT user equipment, and sending a reference signal to the JT user equipment, and sending data to the JT user equipment according to the scheduling information, where the reference signal is the same as a reference signal sent by the network device of the coordinated neighboring cell of the JT user equipment to the JT user equipment.

According to a technical solution provided in this application, during JT, a reference signal and data sent by a network device of a serving cell to JT user equipment are the same as those sent by a network device of a coordinated neighboring cell to the JT user equipment. The reference signal is used to support measurement and channel estimation. Therefore, a redundant reference signal is not required to support the measurement and the channel estimation, so that reference signal overheads are reduced. In addition, reference signals of the serving cell and the coordinated neighboring cell are the same, and reference signal resource locations of the serving cell and the coordinated neighboring cell are the same. A data resource location is determined by the network device of the serving cell, and the network device of the coordinated neighboring cell is notified of the data resource location. That is, data resource locations of the serving cell and the coordinated neighboring cell are also the same. The data resource location does not include the reference signal resource location. Therefore, the network device of the coordinated neighboring cell does not need to perform puncturing on the reference signal resource location in a data resource, so as to further ensure a transmission quality of a data channel.

In a first design, according to the first aspect, the method further includes receiving, by the network device of the serving cell, a JT user equipment feedback sent by the network device of the coordinated neighboring cell, and updating the JT user equipment of the serving cell. The JT user equipment feedback may include a confirmation identifier, so as to confirm whether the JT user equipment request sent by the network device of the serving cell to the network device of the coordinated neighboring cell is accepted by the network device of the coordinated neighboring cell. The JT user equipment feedback may further include a user equipment identifier, so as to instruct the network device of the coordinated neighboring cell, according to the JT user equipment request, JT user equipment accepted by the coordinated neighboring cell. The network device of the serving cell updates the JT user equipment of the serving cell according to the JT user equipment feedback. That is, JT user equipment indicated by the JT user equipment feedback is selected as the JT user equipment, and remaining user equipment of the serving cell is selected as non-JT user equipment. The updating includes if the JT user equipment feedback indicates that the network device of the coordinated neighboring cell accepts the JT user equipment request of the serving cell, the network device of the serving cell keeps the JT user equipment of the serving cell unchanged, that is, does not need to perform an operation.

In this design, when the network device of the serving cell does not receive a JT user equipment feedback from the coordinated neighboring cell, or a received JT user equipment feedback indicates that a JT user equipment request of the serving cell is not accepted, the network device of the serving cell may perform non-JT scheduling on user equipment, and the network device of the serving cell does not send scheduling information of JT user equipment to the network device of the coordinated neighboring cell, so as to reduce implementation complexity.

In a second design, according to the first aspect or the first design of the first aspect, the selecting, by a network device of a serving cell, JT user equipment and a coordinated neighboring cell of the JT user equipment for the serving cell includes when a difference between a measurement quantity of a neighboring cell of user equipment and a measurement quantity of a serving cell of the user equipment is greater than or equal to a threshold A, respectively selecting the user equipment and the neighboring cell as the JT user equipment and the coordinated neighboring cell, when a difference between a measurement quantity of a neighboring cell of user equipment and a measurement quantity of a serving cell of the user equipment is greater than or equal to a sum of a threshold A and an offset A, respectively selecting the user equipment and the neighboring cell as the JT user equipment and the coordinated neighboring cell, when a cell-specific reference signal (CRS) disabling function of a neighboring cell of a serving cell is active, respectively selecting user equipment of the serving cell and the neighboring cell as the JT user equipment and the coordinated neighboring cell, when a difference between a measurement quantity of a neighboring cell of user equipment and a measurement quantity of a serving cell of the user equipment is greater than or equal to a threshold A, and a CRS disabling function of the neighboring cell is active, respectively selecting the user equipment and the neighboring cell as the JT user equipment and the coordinated neighboring cell, when a difference between a measurement quantity of a neighboring cell of user equipment and a measurement quantity of a serving cell of the user equipment is greater than or equal to a sum of a threshold A and an offset A, and a CRS disabling function of the neighboring cell is active, respectively selecting the user equipment and the neighboring cell as the JT user equipment and the coordinated neighboring cell, when a difference between a measurement quantity of a neighboring cell of user equipment and a measurement quantity of a serving cell of the user equipment is greater than or equal to a threshold A, a CRS disabling function of the neighboring cell is active, and a CRS disabling proportion of the neighboring cell is greater than or equal to a threshold B, respectively selecting the user equipment and the neighboring cell as the JT user equipment and the coordinated neighboring cell, or when a difference between a measurement quantity of a neighboring cell of user equipment and a measurement quantity of a serving cell of the user equipment is greater than or equal to a sum of a threshold A and an offset A, a CRS disabling function of the neighboring cell is active, and a CRS disabling proportion of the neighboring cell is greater than or equal to a threshold B, respectively selecting the user equipment and the neighboring cell as the JT user equipment and the coordinated neighboring cell.

In this design, a measurement quantity of the coordinated neighboring cell is limited, so as to ensure a transmission quality of the JT user equipment in the coordinated neighboring cell, and prevent a cell with a relatively low transmission quality from being selected as a JT cell. Data received by a receive end in all JT cells is the same during the JT, and the receive end combines all received same data, and then demodulates the data obtained after combination. Therefore, a cell with a relatively low data transmission quality is prevented from being selected as the JT cell, so as to avoid adding data with a limited contribution to a combination and demodulation gain when the receive end performs data combination and demodulation during the JT, and avoid an implementation complexity increase caused because an amount of data for combination and demodulation increases if a JT gain does not increase.

In this design, the network device of the serving cell selects the JT user equipment and the coordinated neighboring cell of the JT user equipment, and sends the JT user equipment request to the network device of the coordinated neighboring cell. If a coordinated neighboring cell CRS is disabled at a JT moment corresponding to the JT user equipment request, the network device of the coordinated neighboring cell can accept the JT user equipment request. Therefore, the serving cell selects a cell with an active CRS disabling function as the coordinated neighboring cell, or selects a cell with an active CRS disabling function and a CRS disabling proportion greater than a threshold B as the coordinated neighboring cell. Therefore, the JT user equipment request of the serving cell can be accepted by the network device of the coordinated neighboring cell at a higher probability, so that a JT success probability is improved.

In a third design, according to the second design of the first aspect, the method further includes determining, by the network device of the serving cell, at least one of the following: the threshold A, the offset A, an active state of a CRS disabling function of a neighboring cell, a CRS disabling proportion of a neighboring cell, or the threshold B. The network device statically, half-statically, or dynamically determines at least one of the foregoing parameters according to a predefined configuration, a network device parameter configuration, a network device algorithm implementation, or a received message sent by the network device of the coordinated neighboring cell.

In a fourth design, according to the first aspect or any design described above in the first aspect, the method further includes when the network device selects the JT user equipment, if user equipment is selected as the JT user equipment, the user equipment is marked as the JT user equipment, or if user equipment is not selected as the JT user equipment, the user equipment is marked as non-JT user equipment. When the network device selects the JT user equipment, if user equipment is marked as the JT user equipment, but does not meet a JT user equipment selection condition described in the second design of the first aspect, the network device deselects the user equipment, that is, does not select the user equipment as the JT user equipment.

In a fifth design, according to the first aspect or any design described above in the first aspect, the network device of the serving cell sends the JT user equipment request to the network device of the coordinated neighboring cell. Information indicated by the JT user equipment request includes a serving cell identifier and a JT user equipment identifier, or includes a serving cell identifier, a JT user equipment identifier, and a JT moment index. The network device of the serving cell statically, half-statically, or dynamically determines the JT moment index according to a predefined configuration, a network device parameter configuration, or a network device algorithm implementation. In the JT user equipment request, the network device of the serving cell may implicitly indicate the JT moment index. The JT moment corresponds to an index (n+k). The network device of the serving cell sends the JT user equipment request at a moment corresponding to an index n. If the network device of the coordinated neighboring cell receives the JT user equipment request at a moment corresponding to an index m, the network device of the coordinated neighboring cell determines a JT moment index (m+k) corresponding to the JT user equipment request, where n, k, and m are integers. The network device of the serving cell statically, half-statically, or dynamically determines a value of k according to the predefined configuration, the network device parameter configuration, or the network device algorithm implementation. The network device of the coordinated neighboring cell statically, half-statically, or dynamically determines the value of k according to the predefined configuration, the network device parameter configuration, the network device algorithm implementation, or a received message sent by the network device of the serving cell. In the JT user equipment request, the network device of the serving cell may further explicitly indicate the JT moment index. The network device of the serving cell may carry the JT moment index, or an offset p of the JT moment index in the JT user equipment request. A meaning, a value range, a use method, and a determining method of p are the same as those of k described in this design.

In a sixth design, according to the first aspect or any design described above in the first aspect, the scheduling, by the network device of the serving cell, the JT user equipment includes performing scheduling according to at least one of the following: a predefined configuration, a network device parameter configuration, a channel quality indicator (CQI) of the user equipment, a CQI and a rank indicator (RI) of the user equipment, a CQI and a precoding matrix indicator (PMI) of the user equipment, a CQI, an RI, and a PMI of the user equipment, a low interference CQI of the user equipment, a low interference CQI and a low interference RI of the user equipment, a low interference CQI and a low interference PMI of the user equipment, or a low interference CQI, a low interference RI, and a low interference PMI of the user equipment. The low interference CQI of the user equipment is a low interference CQI of a high interference CQI and the low interference CQI of the user equipment, the low interference RI of the user equipment is a low interference RI of a high interference RI and the low interference RI of the user equipment, and the low interference PMI of the user equipment is a low interference PMI of a high interference PMI and the low interference PMI of the user equipment.

In this design, the network device schedules the JT user equipment according to the predefined configuration or the network device parameter configuration, so as to implement simple scheduling, and this scheduling method is applicable to the first time of scheduling. The CQI indicates a quality of a channel used for data transmission. The RI and the PMI indicate a feature of the channel. The network device performs scheduling on user equipment according to the CQI of the user equipment, or the RI and/or the PMI of the user equipment assists the CQI in scheduling user equipment, so that the scheduling information better matches a channel condition, and a data transmission rate is improved. The network device distinguishes the high interference CQI, RI, and PMI and the low interference CQI, RI, and PMI. JT scheduling is performed during the JT. That is, a CQI, an RI, and a PMI used during JT are determined according to a JT transmission channel quality and a JT transmission channel feature. Non-JT scheduling is performed during non-JT. That is, a CQI, an RI, and a PMI used during the non-JT are determined according to a non-JT transmission channel quality and a non-JT transmission channel feature, so that a CQI, an RI, and a PMI used for scheduling can more accurately match a corresponding transmission mode, a data transmission rate is improved, and further a JT scheduling gain is obtained.

In a seventh design, according to the sixth design of the first aspect, the method further includes receiving channel state information (CSI) that is reported by the user equipment and that is received by the network device, where the CSI includes at least one of the CQI, the RI, or the PMI, if the CSI includes the CQI, at a moment at which the user equipment measures the CSI, determining, by the network device, the low interference CQI of the user equipment according to the CQI if a transmission mode of the user equipment is JT, or determining, by the network device, the high interference CQI of the user equipment according to the CQI if a transmission mode of the user equipment is non-JT, if the CSI includes the RI, at a moment at which the user equipment measures the CSI, determining, by the network device, the low interference RI of the user equipment according to the RI if a transmission mode of the user equipment is JT, or determining, by the network device, the high interference RI of the user equipment according to the RI if a transmission mode of the user equipment is non-JT, or if the CSI includes the PMI, at a moment at which the user equipment measures the CSI, determining, by the network device, the low interference PMI of the user equipment according to the PMI if a transmission mode of the user equipment is JT, or determining, by the network device, the high interference PMI of the user equipment according to the PMI if a transmission mode of the user equipment is non-JT.

In an eighth design, according to the sixth or the seventh design of the first aspect, the method further includes at a moment at which the user equipment transmits data, if the transmission mode of the user equipment is the JT, updating, by the network device, the low interference CQI of the user equipment according to a hybrid automatic repeat request (HARQ) feedback of the data, or if the transmission mode of the user equipment is the non-JT, updating, by the network device, the high interference CQI of the user equipment according to an HARQ feedback of the data.

In a ninth design, according to the first aspect or any design described above in the first aspect, the network device of the serving cell sends the reference signal to the JT user equipment. The reference signal is a serving cell CRS. In the JT technology provided in this implementation, user equipment that supports the CRS can support the JT technical solution provided in this design. For example, all user equipments of LTE can support the JT technical solution in this design, so that a limitation on a JT user equipment capability is eliminated, and value of the JT technology is further improved.

In a tenth design, according to the first aspect or any design described above in the first aspect, at the JT moment, when the network device of the serving cell sends the reference signal to the JT user equipment, and the data is sent to the JT user equipment according to the scheduling information, a coordinated neighboring cell CRS of the JT user equipment is disabled. In the JT technology provided in this implementation, at a JT moment at which the coordinated neighboring cell CRS is disabled, there is no common data transmission or CRS transmission of the coordinated neighboring cell in the cell. JT transmission performed at this moment does not affect common transmission in the coordinated neighboring cell.

In an eleventh design, according to the first aspect or any design described above in the first aspect, the network device of the serving cell sends scheduling information to the network device of the coordinated neighboring cell of the JT user equipment, and the scheduling information includes scheduling information of a data channel, and the network device of the serving cell sends data to the JT user equipment according to the scheduling information, and the data includes data of the data channel.

In a twelfth design, according to the first aspect or any design described above in the first aspect, the network device of the serving cell sends scheduling information to the network device of the coordinated neighboring cell of the JT user equipment, and the scheduling information includes scheduling information of a control channel, and the network device of the serving cell sends data to the JT user equipment according to the scheduling information, and the data includes data of the control channel.

In a thirteenth design, according to the first aspect or any design described above in the first aspect, the network device of the serving cell sends scheduling information to the network device of the coordinated neighboring cell of the JT user equipment, and the scheduling information includes scheduling information of a data channel and scheduling information of a control channel, and the network device of the serving cell sends data to the JT user equipment according to the scheduling information, and the data includes data of the data channel and/or data of the control channel.

According to a second aspect, this application provides a JT method, including receiving, by a network device of a coordinated neighboring cell, a JT user equipment request sent by a network device of a serving cell, and selecting accepted JT user equipment, receiving, by the network device of the coordinated neighboring cell, scheduling information of the JT user equipment sent by the network device of the serving cell, and sending, by the network device of the coordinated neighboring cell, a reference signal to the JT user equipment, and sending data to the JT user equipment according to the scheduling information, where the reference signal is the same as a reference signal sent by the network device of the serving cell of the JT user equipment to the JT user equipment.

In a first design, according to the second aspect, the method further includes sending, by the network device of the coordinated neighboring cell, a JT user equipment feedback to the network device of the serving cell, where the JT user equipment feedback includes same information as that described in the first design of the first aspect.

In a second design, according to the second aspect or the first design of the second aspect, the network device of the coordinated neighboring cell receives the JT user equipment request sent by the network device of the serving cell, where the JT user equipment request includes same information as that described in the fifth design of the first aspect.

In a third design, according to the second aspect or any design described above in the second aspect, the method further includes determining, by the network device of the coordinated neighboring cell according to a predefined configuration, a network device parameter configuration, a network device algorithm implementation, or the JT user equipment request, a JT moment index corresponding to the JT user equipment request. A method for indicating the JT moment index by the JT user equipment request and a method for determining the JT moment index by the network device of the coordinated neighboring cell according to the JT user equipment request are the same as those described in the fifth design of the first aspect.

In a fourth design, according to the second aspect or any design described above in the second aspect, the network device of the coordinated neighboring cell receives the JT user equipment request sent by the network device of the serving cell, and selects accepted JT user equipment. The network device of the coordinated neighboring cell selects the accepted JT user equipment according to the JT user equipment request if a coordinated neighboring cell CRS is disabled at a JT moment corresponding to the JT user equipment request. At a moment at which the CRS is disabled, there is no common data transmission or CRS transmission of the coordinated neighboring cell in the cell. JT transmission performed at this moment does not affect common transmission in the coordinated neighboring cell.

In a fifth design, according to the fourth design of the second aspect, the network device of the coordinated neighboring cell receives the JT user equipment request sent by the network device of the serving cell, and selects the accepted JT user equipment according to the JT user equipment request. The network device of the coordinated neighboring cell receives JT user equipment requests sent by a network device to which at least two serving cells belong, where if the JT user equipment requests of the at least two serving cells correspond to a same JT moment, the coordinated neighboring cell CRS is disabled at the JT moment, and the network device of the coordinated neighboring cell selects the accepted JT user equipment according to at least one of the JT user equipment requests of the at least two serving cells. Alternatively, the network device of the coordinated neighboring cell receives JT user equipment requests sent by a network device to which at least two serving cells belong, where if the JT user equipment requests of the at least two serving cells correspond to a same JT moment, the network device of the coordinated neighboring cell does not accept the JT user equipment requests sent by the network device to which the at least two serving cells belong.

In a sixth design, according to the second aspect or any design described above in the second aspect, the method further includes determining, by the network device of the coordinated neighboring cell, the reference signal according to the serving cell identifier. The reference signal is a serving cell CRS.

In a seventh design, according to the second aspect or any design described above in the second aspect, the method further includes sending, by the network device of the coordinated neighboring cell, the reference signal to the JT user equipment at a full bandwidth of the coordinated neighboring cell.

In an eighth design, according to the second aspect or any design described above in the second aspect, the method further includes sending, by the network device of the coordinated neighboring cell, a coordinated neighboring cell CRS at a measurement bandwidth of the coordinated neighboring cell, so as to provide a coordinated neighboring cell measurement.

In a ninth design, according to the second aspect or any design described above in the second aspect, the network device of the coordinated neighboring cell receives scheduling information of the JT user equipment sent by the network device of the serving cell, and the scheduling information includes scheduling information of a data channel, and the network device of the coordinated neighboring cell sends data to the JT user equipment according to the scheduling information, and the data includes data of the data channel.

In a tenth design, according to the second aspect or any design described above in the second aspect, the network device of the coordinated neighboring cell receives scheduling information of the JT user equipment sent by the network device of the serving cell, and the scheduling information includes scheduling information of a control channel, and the network device of the coordinated neighboring cell sends data to the JT user equipment according to the scheduling information, and the data includes data of the control channel.

In an eleventh design, according to the second aspect or any design described above in the second aspect, the network device of the coordinated neighboring cell receives scheduling information of the JT user equipment sent by the network device of the serving cell, and the scheduling information includes scheduling information of a data channel and scheduling information of a control channel, and the network device of the coordinated neighboring cell sends data to the JT user equipment according to the scheduling information, and the data includes data of the data channel and/or data of the control channel.

According to a third aspect, this application provides a network device, and the network device can implement a function of the network device of the serving cell in the method described in the first aspect, or each design of the first aspect. The function may be implemented in a form of hardware, software, or a combination of hardware and software. The hardware or the software includes one or more modules corresponding to the function.

In a first design, according to the third aspect, the network device includes a processing unit, a communication unit, and a transmitter. The processing unit is configured to support the network device to perform the function of the network device of the serving cell in the foregoing method. For example, the processing unit includes a selection module and a scheduling module. The selection module is configured to select JT user equipment and a coordinated neighboring cell of the JT user equipment for the serving cell, and the scheduling module is configured to schedule the JT user equipment. The communication unit is configured to support communication between a network device of the serving cell and a network device of the coordinated neighboring cell. For example, the communication unit is configured to send a JT user equipment request and scheduling information of the JT user equipment to the network device of the coordinated neighboring cell, and the scheduling information includes at least one of scheduling information of a data channel or scheduling information of a control channel. The communication unit may be further configured to receive a JT user equipment feedback sent by the network device of the coordinated neighboring cell. The transmitter is configured to support communication between the network device of the serving cell and user equipment. For example, the transmitter is configured to send a reference signal to the JT user equipment, and send data to the JT user equipment according to the scheduling information. The reference signal is the same as a reference signal sent by the network device of the coordinated neighboring cell of the JT user equipment to the JT user equipment, and the data includes at least one of data of the data channel or data of the control channel. The network device may further include a storage unit that is configured to store a program instruction, or a program instruction and data of the network device.

According to a fourth aspect, this application provides a network device, and the network device can implement a function of the network device of the coordinated neighboring cell in the method described in the second aspect, or each design of the second aspect. The function may be implemented in a form of hardware, software, or a combination of hardware and software. The hardware or the software includes one or more modules corresponding to the function.

In a first design, according to the fourth aspect, the network device includes a processing unit, a communication unit, and a transmitter. The processing unit is configured to support the network device to perform the corresponding function of the network device of the coordinated neighboring cell in the foregoing method. For example, the processing unit includes a selection module that is configured to select, according to a JT user equipment request, JT user equipment accepted by a coordinated neighboring cell. The communication unit is configured to support communication between a network device of the coordinated neighboring cell and a network device of a serving cell. For example, the communication unit is configured to receive a JT user equipment request and scheduling information of the JT user equipment that are sent by the network device of the serving cell, and the scheduling information includes at least one of scheduling information of a data channel or scheduling information of a control channel. The communication unit may be further configured to send a JT user equipment feedback to the network device of the serving cell. The transmitter is configured to support communication between the network device of the coordinated neighboring cell and user equipment. For example, the transmitter is configured to send a reference signal to the JT user equipment, and send data to the JT user equipment according to the scheduling information, where the reference signal is the same as a reference signal sent by the network device of the serving cell of the JT user equipment to the JT user equipment, and the data includes at least one of data of the data channel or data of the control channel. The network device may further include a storage unit that is configured to store a program instruction, or a program instruction and data of the network device.

According to a fifth aspect, this application provides a communications system, and the communications system includes user equipment, the network device of the third aspect, and the network device of the fourth aspect.

According to a sixth aspect, this application provides a chip system, and the chip system includes a processing unit, a communication unit, and a transmitter, and may further include a storage unit, and is configured to support a network device to implement a function of the network device of the serving cell in the method described in the first aspect, or each design of the first aspect. The chip system may include a chip, or include a chip and another discrete device.

According to a seventh aspect, this application provides a chip system, and the chip system includes a processing unit, a communication unit, and a transmitter, and may further include a storage unit, and is configured to support a network device to implement a function of the network device of the coordinated neighboring cell in the method described in the second aspect, or each design of the second aspect. The chip system may include a chip, or include a chip and another discrete device.

According to an eighth aspect, this application provides a computer program product that includes an instruction, and when the computer program product runs in a computer, the computer performs the method described in the first aspect, or each design described in the first aspect.

According to a ninth aspect, this application provides a computer program product that includes an instruction, and when the computer program product runs in a computer, the computer performs the method described in the second aspect, or each design described in the second aspect.

In comparison with the prior art, the JT method, the apparatus, and the system provided in this application aim to reduce reference signal overheads in a JT technology and improve value of the JT technology.

BRIEF DESCRIPTION OF THE DRAWINGS

To describe the technical solutions in the embodiments of the present invention or in the background more clearly, the following briefly describes the accompanying drawings required for describing the embodiments of the present invention or the background.

DETAILED DESCRIPTION OF ILLUSTRATIVE EMBODIMENTS

A network architecture and a service scenario described in embodiments of this application are used to describe a technical solution of the embodiments of this application more clearly, and do not constitute any limitation on the technical solution provided in the embodiments of this application. As the network architecture evolves and a new service scenario emerges, the technical solution provided in the embodiments of this application is also applicable to a similar technical problem.

Figure 1:
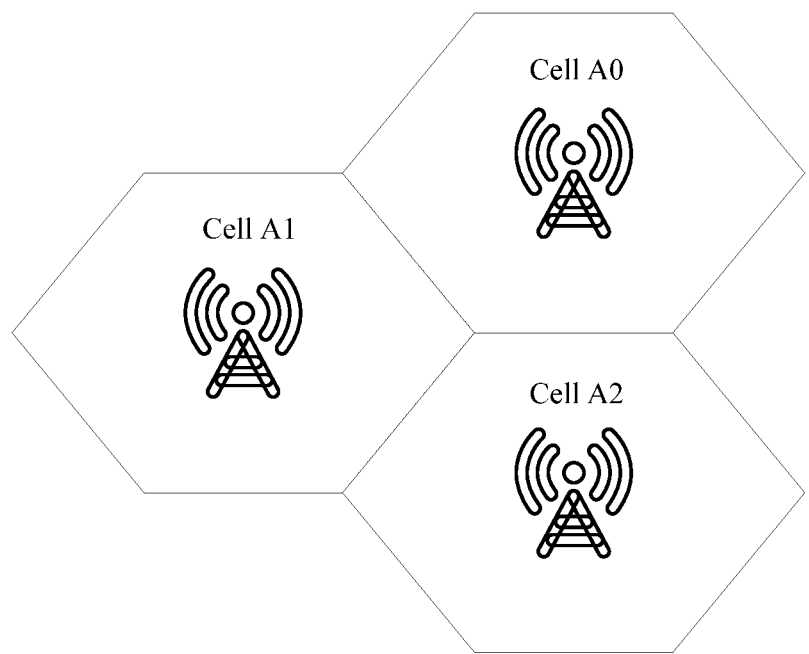
FIG. 1 is a schematic diagram of multiple cells managed by one base station in the prior art.
Figure 2:
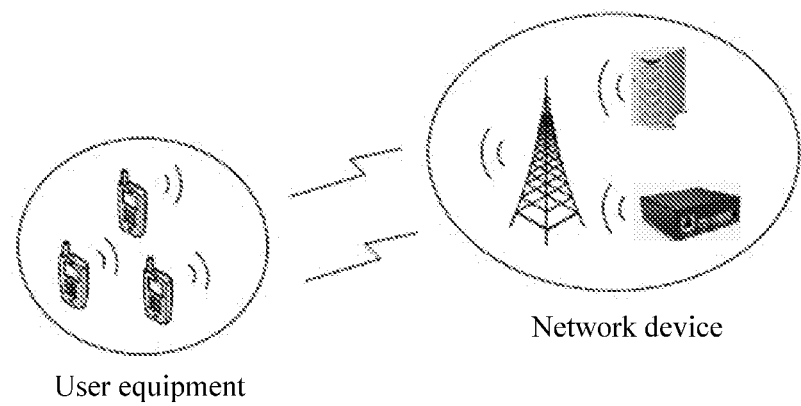
FIG. 2 is a schematic diagram of communication according to an embodiment of this application.

The technical solution provided in this application may be applied to various communications systems, for example, a Global System for Mobile Communications (GSM), a Code Division Multiple Access (CDMA) system, a Wideband Code Division Multiple Access (WCDMA) system, a Time Division-Synchronous Code Division Multiple Access (TD-SCDMA) system, a Universal Mobile Telecommunications System (UMTS), and a Long Term Evolution (LTE) system. As the communication technology continuously develops, the technical solution provided in this application may be further applied to a future network, such as a fifth generation mobile communication technology (5G) system. In this application, a scope of a term "system" is similar to that of a term "network". In a communications system, as shown in FIG. 2, FIG. 2 is a schematic diagram of a possible application scenario of the technical solution according to this application. In the figure, user equipment communicates with a network device over a wireless air interface. This application may be further applied to communication between network devices over wired connection or over wireless air interface, or communication in a scenario of device-to-device (D2D), or machine-to-machine (M2M).

The user equipment (UE) related to this application includes a hand-held device, a vehicle-mounted device, a wearable device, or a calculation device that has a wireless communication function, or another processing device that connects to a wireless modem. The user equipment may be further referred to as a terminal (terminal), a mobile station MS (MS), a mobile terminal (MT), a user terminal (UT), a user agent (UA), a terminal equipment (TE), or the like. This is not limited in this application.

The network device related to this application includes a base station BS (BS), a network controller, a mobile switching center, or another access network device, and is an apparatus deployed in a radio access network to provide a wireless communication function for the user equipment. The base station includes a macro base station, a micro base station, a relay node, an access point, and the like that are in multiple forms. For example, the base station may be a base station in GSM or CDMA, a base transceiver station (BTS), may be a base station in WCDMA, a NodeB, may further be an evolved NodeB in LTE, an eNB or an e-NodeB (evolved Node B), and may further be a base station in the 5G system (for example, may be referred to as a transmission reception point TRP (TRP) or a gNB (generation Node B), or have another name), or a base station in a future network. This is not limited in this application. One base station manages one or more cells, and one cell may have one or more user equipments. In a cell, a channel receiving quality and a transmission rate of cell-edge user equipment are lower than those of cell-center user equipment.

Figure 3:
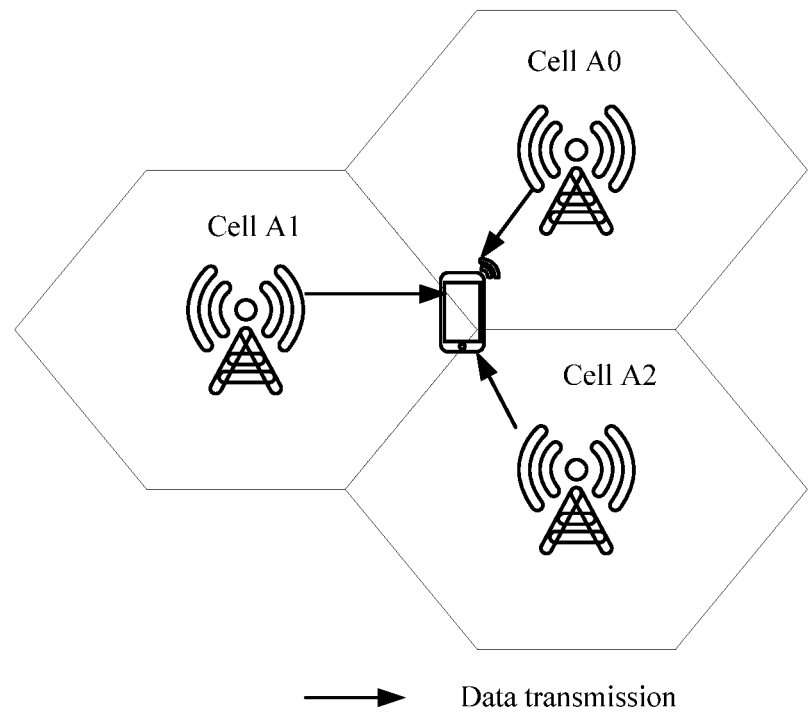
FIG. 3 is a schematic diagram of joint transmission according to an embodiment of this application.
Figure 4:
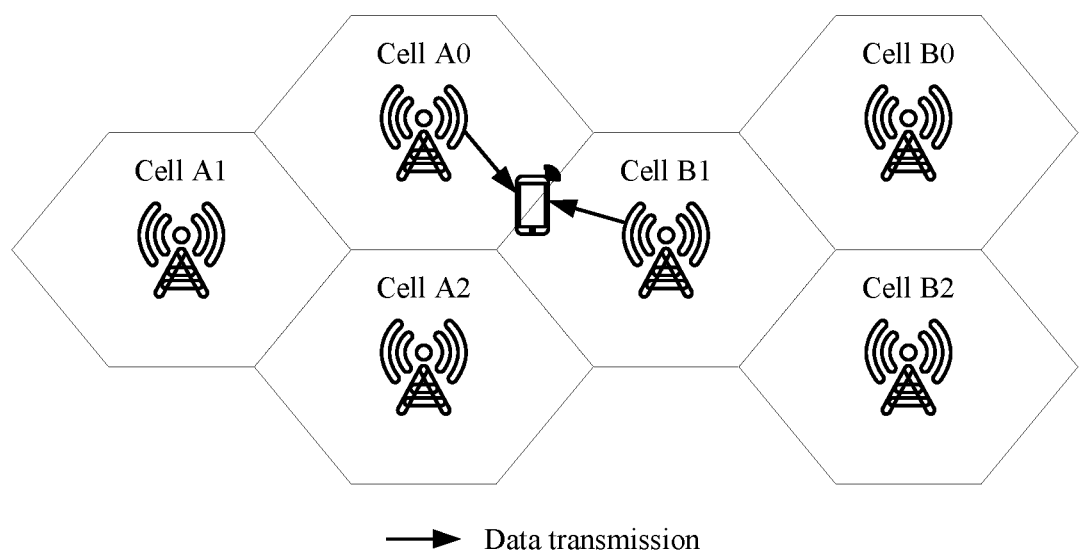
FIG. 4 is a schematic diagram of another joint transmission according to an embodiment of this application.

To improve the transmission rate of the cell-edge user equipment, in a current wireless communication technology, for example, in a release 10 (R10) of LTE, a joint transmission (JT) technology is proposed, and a transmission mode corresponding to the joint transmission technology is a transmission mode 10 (TM 10). In the JT technology, at a JT moment, a base station sends, in multiple cells, same data to same edge user equipment, or a base station receives, in multiple cells, data sent by same edge user equipment. That is, a receive end may receive multiple pieces of same data at the JT moment, and may combine the multiple pieces of same data, and then decode the data obtained after combination, so as to obtain a combination gain and improve a decoding correctness percentage, and finally improve a data transmission rate of the edge user equipment. A cell in the multiple cells may be referred to as a JT cell, or may be referred to as a JT cell of the edge user equipment. The edge user equipment may be referred to as JT user equipment. The JT moment is a moment at which JT is performed on the JT user equipment. In this application, a moment may be a specific time or time unit corresponding to the moment. In this application, the time unit may be a transmission time unit, a scheduling time unit, a resource mapping time unit, or the like. This is not limited in this application. For example, the time unit may be a symbol, a slot, a mini-slot (a mini-slot or a sub-slot), a TTI (transmission time interval), a subframe, a radio frame, or the like. The multiple JT cells in the JT technology may be multiple cells of one base station shown in FIG. 3 (for example, in FIG. 3, JT cells of user equipment are a cell A0, a cell A1, and a cell A2 of a base station A), or may be multiple cells of multiple base stations shown in FIG. 4 (for example, in FIG. 4, JT cells of user equipment are a cell A0 of a base station A and a cell B1 of a base station B). One JT cell in the multiple JT cells may be configured by the base station as a serving cell of the edge user equipment, and may provide a radio resource management function and a data transmission function for the edge user equipment. Remaining JT cells may be configured by the base station as coordinated neighboring cells of the edge user equipment, and may provide a data transmission function for the edge user equipment.

During downlink JT, for example, in the TM 10 of LTE, for a JT cell, the base station needs to send, to the user equipment, a cell-specific reference signal (CRS), a demodulation reference signal (DMRS), and multiple sets of channel state information-reference signal (CSI-RS). The CRS, the DMRS, and the CSI-RSs are mainly used to provide a measurement function and a channel estimation function, so as to assist data transmission between the base station and the user equipment. That is, during JT, available resources in the JT cell during the data transmission between the base station and the user equipment are resources obtained by subtracting resources of the CRS, the DMRS, and the multiple CSI-RSs of the cell from total time-frequency resources of the cell. However, in a transmission mode (for example, a TM 1 to a TM 4) defined in a release 8 (R8) of LTE, when performing downlink transmission with the user equipment, the base station needs to send, to the user equipment, only a CRS of a cell in which the user equipment is located. The CRS is mainly used to provide a measurement function and a channel estimation function, so as to assist the data transmission between the base station and the user equipment. That is, the available resources during the transmission between the base station and the user equipment are resources obtained by subtracting resources of the CRS of the cell from total time-frequency resources of the cell to which the user equipment access. It may be learned from comparison that the TM 10 provides redundant resource overheads of a DMRS and multiple sets of CSI-RS relative to the transmission mode of the R8, and therefore a relatively small quantity of resources are available to the data transmission. During the JT, a base station of the serving cell determines a resource location A to which data is mapped when the data is transmitted, and a base station of each JT cell transmits data to the user equipment at the resource location A. CRSs of different JT cells in the TM 10 may have different time-frequency resource locations, and in a coordinated neighboring cell, the resource location A may include a CRS resource location B of the coordinated neighboring cell. Therefore, when transmitting data, a base station of the coordinated neighboring cell needs to perform resource puncturing on the resource location B in the resource location A (the resource puncturing may be further considered as reservation of a resource, and the resource is not used for the data transmission). The puncturing processing increases code rate for a data transmission, thereby increasing a demodulation error risk. Based on the foregoing analysis, when JT is performed on the edge user equipment, the TM 10 has a JT gain to an extent compared with a conventional transmission mode of the R8 of LTE. However, the TM 10 has a relatively small quantity of resources available to the data transmission and has an additionally-introduced demodulation error risk. Therefore, the JT gain of the TM 10 is greatly reduced, and even a negative gain occurs compared with the transmission mode of the R8. In addition, a terminal is required to support the TM 10 in the JT technology, and a proportion of terminals that support the TM 10 is extremely low in the current market. Therefore, an application scope of the JT technology is further limited. On this basis, in this application, to reduce JT overheads and break through a limitation of the JT on a user equipment capability, a corresponding JT technical solution is proposed.

Figure 5:
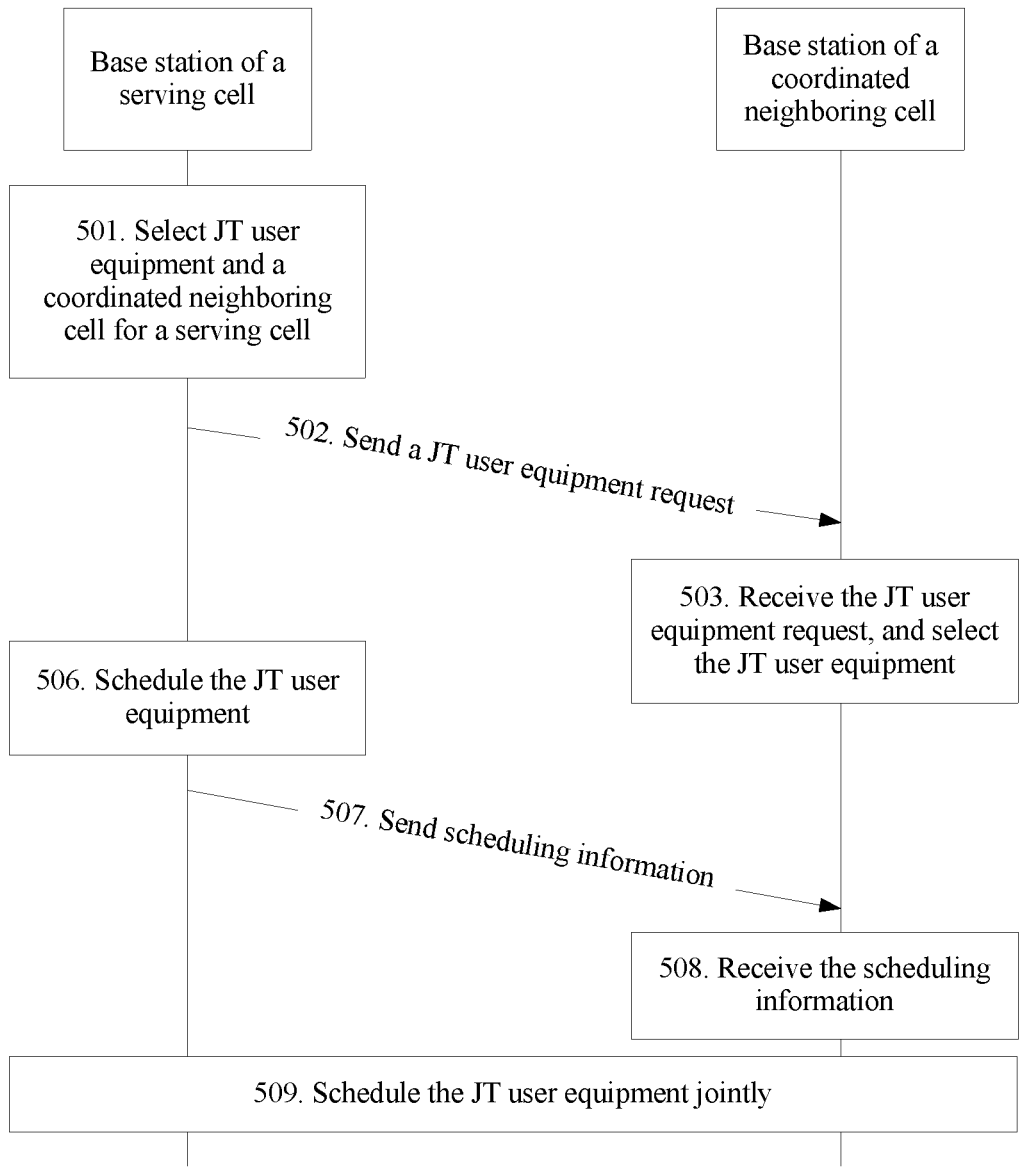
FIG. 5 is a schematic flowchart of joint transmission according to an embodiment of this application.

The following describes a JT technical solution according to an embodiment of this application with reference to FIG. 5. In this embodiment, description is provided by using an example in which a base station is used as a network device.

Part 501: A base station of a serving cell selects JT user equipment and a coordinated neighboring cell of the JT user equipment for the serving cell.

The base station may select the JT user equipment and the coordinated neighboring cell of the JT user equipment according to a measurement quantity of a neighboring cell of user equipment. The measurement quantity is a reference signal received power (RSRP) or a reference signal signal-to-noise ratio (SNR). The base station triggers, in the serving cell, user equipment to perform cell (including a neighboring cell and a serving cell) measurement, and receives a message that carries a cell measurement quantity and that is reported by the user equipment, so that a cell measurement quantity of the user equipment is determined. For user equipment in the serving cell, when determining that a measurement quantity of a neighboring cell A of the user equipment meets a rule A, the base station respectively selects the user equipment and the neighboring cell A as the JT user equipment of the serving cell and the coordinated neighboring cell of the JT user equipment. The rule A is: (a measurement quantity of a neighboring cell of user equipment-a measurement quantity of a serving cell of the user equipment)>=a threshold A, or (a measurement quantity of a neighboring cell of user equipment-a measurement quantity of a serving cell of the user equipment)>=(a threshold A+an offset A). Values of the threshold A and the offset A are real numbers. The base station may statically, semi-statically, or dynamically determine the threshold A and the offset A according to a predefined configuration, a base station parameter configuration, or a base station algorithm implementation. During JT, a measurement quantity of the coordinated neighboring cell is limited to meeting the rule A, so that a data transmission quality in a JT cell is ensured. That is, a higher received power or SNR of a reference signal of a cell received by the user equipment indicates a better channel condition between the user equipment and the base station, a higher available transmission rate, and a lower bit error rate or block error rate may be provided, so as to avoid selecting a cell with a relatively low data transmission quality as the JT cell. Data received by a receive end in all JT cells is the same during the JT, and the receive end combines all received same data, and then demodulates the data obtained after combination. Therefore, a cell with a relatively low data transmission quality is prevented from being selected as the JT cell, so as to avoid adding data with a limited contribution to a combination and demodulation gain when the receive end performs data combination and demodulation during the JT, and avoid an implementation complexity increase caused because an amount of data for combination and demodulation increases if a JT gain does not increase. Further, for JT user equipment, when the base station can select multiple cells as coordinated neighboring cells according to a measurement quantity of a neighboring cell, to reduce JT implementation complexity, the base station may preferentially select a cell with a relatively large measurement quantity from the multiple cells as the coordinated neighboring cell.

The base station may further select the JT user equipment and the coordinated neighboring cell of the JT user equipment according to an active state of a CRS disabling function of a neighboring cell. The base station of the serving cell statically, half-statically, or dynamically determines the active state of the CRS disabling function of the neighboring cell according to a predefined configuration, a base station parameter configuration, a base station algorithm implementation, or a received message sent by a base station of the coordinated neighboring cell. When a CRS disabling function of the neighboring cell A is in an active state, the base station respectively selects the user equipment of the serving cell and the neighboring cell A as the JT user equipment of the serving cell and the coordinated neighboring cell of the JT user equipment. The CRS disabling function is a function of disabling CRS transmission. For example, in LTE, in a subframe, there is mainly transmission of a reference signal, and a data channel and a control channel that are used for data transmission, and further there may be transmission of channels such as a synchronization channel, a broadcast channel, a feedback channel, and a format indicator channel. When a cell is a lightly loaded cell, that is, the cell has a relatively small traffic volume, in the cell, in a subframe, the base station needs to transmit data only at a relatively small bandwidth, or even does not need to transmit data, but needs to transmit, at a whole bandwidth, a CRS on a resource to which the CRS is mapped, so as to perform measurement and channel estimation. Therefore, for a cell A, when a neighboring cell B of the cell A is a lightly loaded cell, a CRS of the neighboring cell B is a main interference source of the neighboring cell B for the cell A. Interference caused by the CRS of the neighboring cell B to the cell A is reduced, so that transmission performance of the cell A can be improved. Therefore, when a cell is a lightly loaded cell, to reduce interference caused by a CRS of the cell to a neighboring cell, the base station activates a CRS disabling function in the cell, and statically, semi-statically, or dynamically configures several subframes in the cell as CRS disabling subframes. There is no transmission of any channel (including CRS transmission) in the CRS disabling subframes. Optionally, to provide a measurement function in the CRS disabling subframes, the base station may configure a measurement bandwidth for the CRS disabling subframes, and sends, at the measurement bandwidth, a CRS on a resource to which the CRS is mapped. For example, the measurement bandwidth may be six central resource blocks (RB) in a system bandwidth. In the technical solution of this application, the subframe may be replaced with another time unit, for example, a symbol, a TTI, a slot, or a mini-slot. The CRS may have another name, and provide a function such as channel estimation or measurement, and is public level (for example, a cell level, or a user equipment group level) downlink reference signal. The channel may be further referred to as a signal or another name, and provide a path or a carrier for data transmission between a base station and a terminal, between base stations, or between terminals, or is used to perform a function such as channel estimation, measurement, or synchronization. The reference signal may be further referred to as a pilot or another name, and is used to perform channel estimation, measurement, or the like.

The base station may select the JT user equipment and the coordinated neighboring cell of the JT user equipment according to a measurement quantity of a neighboring cell of user equipment and an active state of a CRS disabling function of the neighboring cell. For user equipment in the serving cell, when determining that a measurement quantity of a neighboring cell A of the user equipment meets the foregoing rule A, and a CRS disabling function of the neighboring cell A is active, the base station respectively selects the user equipment and the neighboring cell A as the JT user equipment of the serving cell and the coordinated neighboring cell of the JT user equipment.

The base station may select the JT user equipment and the coordinated neighboring cell of the JT user equipment according to a measurement quantity of a neighboring cell of user equipment, an active state of a CRS disabling function of the neighboring cell, and a CRS disabling proportion of the neighboring cell. For user equipment in the serving cell, when determining that a measurement quantity of a neighboring cell A of the user equipment meets the foregoing rule A, a CRS disabling function of the neighboring cell A is active, and a CRS disabling proportion of the neighboring cell A is greater than or equal to a threshold B, the base station respectively selects the user equipment and the neighboring cell A as the JT user equipment of the serving cell and the coordinated neighboring cell of the JT user equipment. The CRS disabling proportion is a proportion of a quantity of subframes in which a CRS is disabled within a time period to a total quantity of subframes in the time period. The base station of the serving cell may statically, semi-statically, or dynamically determine the CRS disabling proportion and the threshold B according to a predefined configuration, a base station parameter configuration, a base station algorithm implementation, or a received message sent by a base station of the coordinated neighboring cell. In this embodiment, the base station of the serving cell selects the JT user equipment and the coordinated neighboring cell of the JT user equipment, and sends a JT user equipment request to the base station of the coordinated neighboring cell. If a coordinated neighboring cell CRS is disabled at a JT moment corresponding to the JT user equipment request, the base station of the coordinated neighboring cell can accept the JT user equipment request. Therefore, the base station of the serving cell selects a cell with a CRS disabling proportion greater than the threshold B as the coordinated neighboring cell, so that a probability of accepting the JT user equipment request of the serving cell by the base station of the coordinated neighboring cell can be increased, and a JT success probability is improved.

In a data transmission process, the base station may select the JT user equipment for the serving cell for multiple times. During one time of JT user equipment selection, when user equipment is selected as the JT user equipment, the base station marks the user equipment as the JT user equipment, or when user equipment is not selected as the JT user equipment, the base station marks the user equipment as non-JT user equipment. During one time of JT user equipment selection, for user equipment, if the user equipment is marked as the JT user equipment, but currently does not meet the foregoing various JT user equipment selection conditions, the base station deselects the user equipment in this JT user equipment selection process, that is, does not select the user equipment as the JT user equipment.

Part 502: The base station of the serving cell sends a JT user equipment request to a base station of the coordinated neighboring cell, so as to request to perform JT on requested JT user equipment at a JT moment.

The JT user equipment request includes a serving cell identifier and a JT user equipment identifier. The JT user equipment request may include an identifier of one JT user equipment. For example, if a base station A selects user equipment 0 as the JT user equipment for a serving cell A0, and selects a cell B0 of a base station B as a coordinated neighboring cell of the user equipment 0, the base station A sends a JT user equipment request to the base station B, and the request includes an identifier of the user equipment 0. The JT user equipment request may further include identifiers of multiple JT user equipments. For example, the base station A selects user equipment 0 and user equipment 1 as the JT user equipment for the serving cell A0, and a cell B0 of the base station B is a coordinated neighboring cell of both the user equipment 0 and the user equipment 1. A JT user equipment request that corresponds to the cell B0 and that is sent by the base station A to the base station B includes identifiers of the user equipment 0 and the user equipment 1.

The JT user equipment request may further include a JT moment or a JT moment index. The base station of the serving cell may determine the JT moment or the JT moment index according to the predefined configuration, a parameter configuration, or the base station algorithm implementation. In comparison with the first two methods for determining the JT moment, the JT moment may be flexibly configured according to a requirement by using the base station algorithm implementation. During the JT, a base station in which a JT cell is located performs the JT at a same JT moment. Therefore, when the base station of the serving cell can flexibly configure the JT moment, the base station of the serving cell needs to indicate, to the base station of the coordinated neighboring cell, the JT moment or the JT moment index configured by the base station of the serving cell. The base station may implicitly indicate the JT moment or the JT moment index. For example, data is transmitted on a per-subframe basis, and the JT moment is recorded as a JT subframe. When the base station of the serving cell determines an index corresponding to the JT subframe as (n+k), the base station sends the JT user equipment request in a subframe corresponding to an index n. After receiving the JT user equipment request in a subframe corresponding to an index m, the base station of the coordinated neighboring cell may determine an index (m+k) corresponding to the JT subframe, where m, n, and k are integers. The base station of the serving cell may statically, semi-statically, or dynamically determine a value of k according to the predefined configuration, the base station parameter configuration, or the base station algorithm implementation. The base station of the coordinated neighboring cell may statically, half-statically, or dynamically determine the value of k by using the predefined configuration, the base station parameter configuration, the base station algorithm implementation, or a received message sent by the base station of the serving cell. The JT moment is implicitly indicated, and a redundant information bit is not required to indicate the JT moment, so that signaling overheads can be reduced. The base station may further explicitly indicate the JT moment or the JT moment index. For example, the JT user equipment request includes the JT moment index, or the JT user equipment request includes an offset p of the JT moment. A meaning, a value range, a use method, and a determining method of p are the same as those of k. The JT moment is explicitly indicated, so that a more flexible JT moment can be provided.

When the base station selects multiple coordinated neighboring cells for one JT user equipment, a serving cell may send a JT user equipment request to the multiple coordinated neighboring cells.

In this application, the base station of the serving cell may actually or logically send a message to the base station of the coordinated neighboring cell. Alternatively, the base station of the coordinated neighboring cell may actually or logically send a message to the base station of the serving cell. For example, when the serving cell and the coordinated neighboring cell are located in different base stations, the sending is actual sending. That is, different base stations send messages to each other by using an interface between the base stations (for example, an X2 interface in LTE). When the serving cell and the coordinated neighboring cell are located in a same base station, the sending is logical sending. That is, the base station obtains, in the serving cell by using an inner design or an algorithm implementation, content indicated by the message of the coordinated neighboring cell, or obtains, in the coordinated neighboring cell by using an inner design or an algorithm implementation, content indicated by the message of the serving cell, for example, by means of information sharing between cells.

Part 503: The base station of the coordinated neighboring cell receives the JT user equipment request sent by the base station of the serving cell, and selects accepted JT user equipment.

The base station of the coordinated neighboring cell determines, according to the predefined configuration, the base station parameter configuration, or the base station algorithm implementation, a JT moment corresponding to the JT user equipment request, and selects the accepted JT user equipment according to a CRS disabled state of the coordinated neighboring cell at the JT moment and JT user equipment indicated by the JT user equipment request. At the JT moment, if the coordinated neighboring cell CRS is in a disabled state, the base station selects the accepted JT user equipment according to the JT user equipment request. The base station may select several user equipments indicated by the JT user equipment request as the JT user equipment accepted by the coordinated neighboring cell.

The base station of the coordinated neighboring cell determines, according to information indicated by the JT user equipment request, a JT moment corresponding to the JT user equipment request. As described in part 502, the base station of the coordinated neighboring cell selects, according to the CRS disabled state of the coordinated neighboring cell at the JT moment and the JT user equipment indicated by the JT user equipment request, the JT user equipment accepted by the coordinated neighboring cell. A selection method is the same as that in the foregoing description.

At a moment at which the CRS is disabled, there is no common (for example, non-JT) data transmission or CRS transmission of the coordinated neighboring cell in the cell. JT transmission performed at this moment does not affect common transmission in the coordinated neighboring cell.

For a coordinated neighboring cell, a base station of the coordinated neighboring cell may receive multiple JT user equipment requests sent by a base station to which multiple serving cells belong. If the JT user equipment requests correspond to a same JT moment, a coordinated neighboring cell CRS is disabled at the JT moment. The base station of the coordinated neighboring cell may select accepted JT user equipment according to at least one of the JT user equipment requests, that is, selects several user equipments corresponding to several JT user equipment requests as the JT user equipment accepted by the coordinated neighboring cell, and ignores a JT user equipment request that is not accepted.

For a coordinated neighboring cell, a base station of the coordinated neighboring cell may receive multiple JT user equipment requests sent by a base station to which multiple serving cells belong. If the JT user equipment requests correspond to a same JT moment, the base station of the coordinated neighboring cell may accept none of the JT user equipment requests, so as to avoid possible interference. For example, if a base station to which two serving cells belong selects a same coordinated neighboring cell according to a measurement quantity of a neighboring cell as described in part 501, data sent by a base station of the coordinated neighboring cell may have approximately equivalent receiving qualities in the two serving cells. If the base station of the coordinated neighboring cell accepts a JT user equipment request of a base station to which a first serving cell belongs, data that is of JT user equipment of the first serving cell and that is sent by the base station of the coordinated neighboring cell may be received by a base station to which a second serving cell belongs, and cell interference is caused to the second serving cell, which is conversely similar.

Therefore, to avoid such possible interference, the base station of the coordinated neighboring cell may accept none of the JT user equipment requests of the multiple serving cells for the coordinated neighboring cell.

Part 506: The base station of the serving cell schedules the JT user equipment.

The base station schedules the JT user equipment according to at least one of the following: a predefined configuration, a base station parameter configuration, a channel quality indicator (CQI) of the user equipment, a CQI and a rank indicator (RI) of the user equipment, a CQI and a precoding matrix indicator (PMI) of the user equipment, or a CQI, an RI, and a PMI of the user equipment, so as to determine scheduling information of the JT user equipment. That is, the scheduling information is at least one of the following: data transmitted by the JT user equipment during the JT, information about a resource location to which data is mapped, or a modulation and coding scheme (MCS) used for data transmission. If a transmit end needs to perform a precoding operation on data according to a precoding matrix, the scheduling information further includes the precoding matrix. The scheduling information may be at least one of scheduling information of a data channel or scheduling information of a control channel. Correspondingly, the data may be at least one of data of the data channel or data of the control channel. That the base station schedules the JT user equipment according to at least one of the following: the CQI, the CQI and the RI, the CQI and the PMI, or the CQI, the RI, and the PMI means that the base station schedules, by using a scheduling algorithm, the JT user equipment according to at least one of the following: the CQI, the CQI and the RI, the CQI and the PMI, or the CQI, the RI, and the PMI. The base station configures user equipment to measure CSI (CSI) in the serving cell, and sends a reference signal to the user equipment. The user equipment receives and then measures the reference signal, and reports the CSI to the base station. The CSI includes at least one of the CQI, the RI, or the PMI. The base station receives the CSI. If the CSI includes the CQI, a user equipment CQI used for scheduling is determined according to the CQI. If the CSI includes the RI, a user equipment RI used for scheduling is determined according to the RI. For example, the RI is used as the user equipment RI for scheduling. If the CSI includes the PMI, a user equipment PMI that is used for scheduling is determined according to the PMI. For example, the PMI is used as the user equipment PMI that is used for scheduling. The CQI indicates a quality of a channel used for data transmission. The RI and the PMI indicate a feature of the channel. Scheduling is performed according to the CQI, or the RI and/or the PMI assists the CQI in scheduling, so that the scheduling information better matches a channel condition, and a data transmission rate is improved.

In a communication process, the base station may communicate data with JT user equipment for one or more times. One time of data transmission corresponds to one scheduling process. The base station transmits data to the user equipment according to the scheduling information. Different times of data transmission may correspond to a same scheduling method, or different scheduling methods. For example, when communicating data with the JT user equipment for the first time, the base station schedules the user equipment according to predefined configuration or base station parameter configuration. When communicating data with the user equipment for another time, the base station schedules the user equipment according to the user equipment CQI.

Part 507: The base station of the serving cell sends scheduling information determined in part 506 to the base station of the coordinated neighboring cell.

Part 508: The base station of the coordinated neighboring cell receives the scheduling information of the JT user equipment sent by the base station of the serving cell.

Part 509: At the JT moment, the base station of the serving cell and the base station of the coordinated neighboring cell send a same reference signal to the JT user equipment, and send data to the JT user equipment according to the scheduling information.

At the JT moment, the base station of the serving cell and the base station of the coordinated neighboring cell send same data to the JT user equipment at a same data resource location. The data is at least one of the data of the data channel or the data of the control channel. For determining data, a resource location to which the data is mapped, the MCS, and the PMI by the base station, refer to the descriptions in part 506 and part 508. Details are not described herein again.

At the JT moment, the base station of the serving cell and the base station of the coordinated neighboring cell send a same serving cell CRS to the JT user equipment at a same resource location. Information about the serving cell CRS is determined by the base station according to a serving cell identifier. The information about the CRS includes a resource location to which the CRS is mapped and a sequence value carried in the CRS. During the JT, in a JT cell, the base station may send the serving cell CRS at a CRS resource location at a full bandwidth of a system bandwidth, so as to measure a JT wideband, or may send the serving cell CRS at the CRS resource location at a part bandwidth of the system bandwidth, so as to measure a JT sub-band. Further, the base station of the coordinated neighboring cell may configure a measurement bandwidth for the coordinated neighboring cell. For example, the measurement bandwidth is six central RBs in a system bandwidth. The base station sends, in the measurement bandwidth of the coordinated neighboring cell, a CRS determined according to a coordinated neighboring cell identifier, that is, a coordinated neighboring cell CRS, so as to provide a real-time measurement for common user equipment of the coordinated neighboring cell.

In comparison with a TM 10 of LTE, in the JT solution provided in this embodiment, a base station sends only a reference signal that is a CRS to JT user equipment in a serving cell and a coordinated neighboring cell, and does not need to send a DMRS or multiple CSI-RSs, so that reference signal overheads are reduced and a relatively large quantity of data channel resources are provided. In addition, during JT in this embodiment, a CRS resource location is determined according to a serving cell identifier, a data resource location is determined by a base station of the serving cell, and a base station in which the coordinated neighboring cell is located is notified of the data resource location. The data resource location does not include the CRS resource location. Therefore, the base station does not puncture a CRS resource in a data resource, so as to further ensure a transmission quality of a data channel. Further, user equipment that supports the CRS can support the JT technical solution in this embodiment. For example, all user equipments of LTE can support the JT technical solution in this embodiment, so that a limitation on a JT user equipment capability is eliminated, and value of the JT technology is further improved.

In this embodiment, parts 501 to 503, and parts 506 to 508, and part 509 may be performed at a same time unit, or parts 501 to 503 and parts 506 to 508 may be performed before part 509. In addition, parts 501 to 503 and parts 506 to 508 may be performed at a same time unit, or may be performed at different time units.

Figure 6:
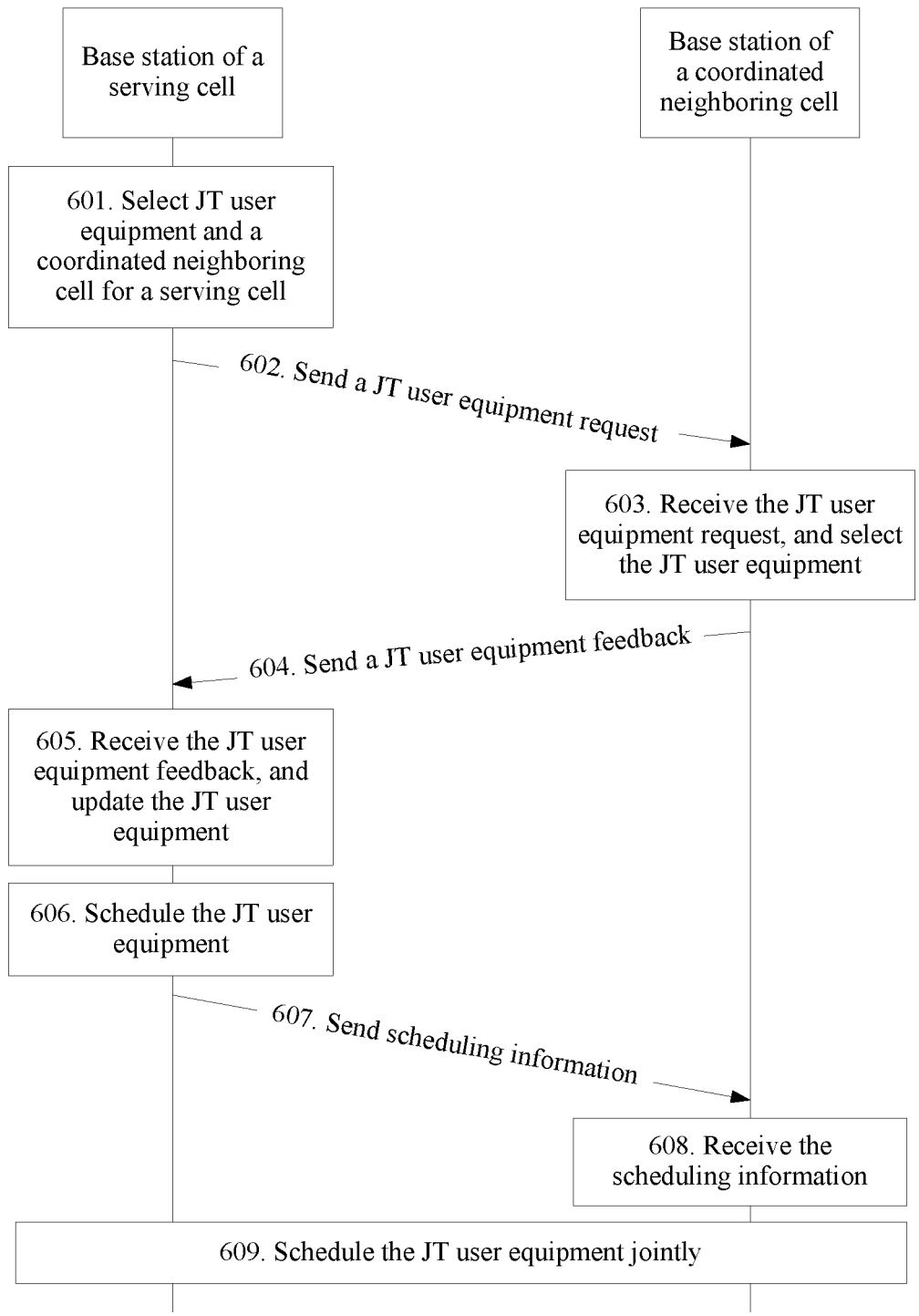
FIG. 6 is a schematic flowchart of another joint transmission according to an embodiment of this application.

The following describes another JT technical solution according to an embodiment of the present invention with reference to FIG. 6. In this embodiment, description is provided by using an example in which a network device is a base station.

Part 601: A base station of a serving cell selects JT user equipment and a coordinated neighboring cell of the JT user equipment for the serving cell. The method is the same as that in part 501.

Part 602: The base station of the serving cell sends a JT user equipment request to a base station of the coordinated neighboring cell, so as to request to perform JT on the JT user equipment at a JT moment. The method is the same as that in part 502.

Part 603: The base station of the coordinated neighboring cell receives the JT user equipment request sent by the base station of the serving cell, and selects accepted JT user equipment. The method is the same as that in part 503.

Part 604: The base station of the coordinated neighboring cell sends a JT user equipment feedback to the base station of the serving cell.

The JT user equipment feedback may include a confirmation identifier, so as to confirm whether the JT user equipment request sent by the network device of the serving cell to the network device of the coordinated neighboring cell is accepted by the network device of the coordinated neighboring cell. For example, the confirmation identifier may include one-bit information that has a value of 0 or 1. A value of 1 indicates that the JT user equipment request of the serving cell is accepted. That is, the base station of the coordinated neighboring cell selects user equipment indicated by the JT user equipment request of the serving cell as the JT user equipment of the coordinated neighboring cell, and performs JT on the JT user equipment. A value of 0 indicates that the JT user equipment request of the serving cell is not accepted. That is, the JT is not performed on user equipment indicated by the JT user equipment request. In another example, the confirmation identifier may further include a bitmap (bitmap). The bitmap includes several bits of information. Each piece of bit information is in a one-to-one correspondence with user equipment indicated by the JT user equipment request of the serving cell. Each piece of bit information has a value of 0 or 1. A value of 1 indicates that user equipment corresponding to the bit information is accepted as the JT user equipment of the coordinated neighboring cell. A value of 0 indicates that user equipment corresponding to the bit information is not accepted as the JT user equipment of the coordinated neighboring cell.

The JT user equipment feedback may further include several user equipment identifiers, so as to indicate the JT user equipment selected by the base station of the coordinated neighboring cell for the coordinated neighboring cell according to the JT user equipment request of the serving cell.

Part 605: The base station of the serving cell receives the JT user equipment feedback sent by the base station of the coordinated neighboring cell.

The base station updates the JT user equipment of the serving cell according to the JT user equipment feedback. That is, JT user equipment indicated by the JT user equipment feedback is selected as the JT user equipment, and remaining user equipment of the serving cell is selected as non-JT user equipment. The updating includes if the JT user equipment feedback indicates that the base station of the coordinated neighboring cell accepts the JT user equipment request of the serving cell, that is, indicates that the base station of the coordinated neighboring cell accepts all user equipments indicated by the JT user equipment request as the JT user equipment of the coordinated neighboring cell, the base station of the serving cell keeps the JT user equipment of the serving cell unchanged, that is, does not need to perform an operation.

Part 606: The base station of the serving cell schedules the JT user equipment.

Part 606 includes the method in part 506.

In addition, the base station may further schedule the JT user equipment according to at least one of the following: a low interference CQI of the JT user equipment, a low interference CQI and a low interference RI of the JT user equipment, a low interference CQI and a low interference PMI of the JT user equipment, or a low interference CQI, a low interference RI, and a low interference PMI of the JT user equipment. The low interference CQI of the JT user equipment is a low interference CQI of a high interference CQI and the low interference CQI of the user equipment, the low interference RI of the JT user equipment is a low interference RI of a high interference RI and the low interference RI of the user equipment, and the low interference PMI of the JT user equipment is a low interference PMI of a high interference PMI and the low interference PMI of the user equipment. The base station obtains, by using the method described in part 505, CSI reported by user equipment. If the CSI includes the CQI, a high interference CQI and a low interference CQI of the user equipment are determined by using the CQI. If the CSI includes the RI, a high interference RI and a low interference RI of the user equipment are determined by using the RI. If the CSI includes the PMI, a high interference PMI and a low interference PMI of the user equipment are determined by using the PMI. For example, the base station receives, at a moment T1, the CSI reported by the user equipment, and the base station sends or the user equipment receives, at a moment T2, a reference signal used for measuring the CSI. There is a known time sequence relationship between T1 and T2. After receiving the CSI at the moment T1, the base station determines T2 according to T1. If the CSI includes the CQI, the base station determines the low interference CQI of the user equipment according to the CQI if the base station performs JT on the user equipment at T2, or the base station determines the high interference CQI of the user equipment according to the CQI if the base station does not perform JT on the user equipment at T2. If the CSI includes the RI, the base station determines the low interference RI of the user equipment according to the RI if the base station performs JT on the user equipment at T2, for example, the RI is used as the low interference RI of the user equipment, or the base station determines the high interference RI of the user equipment according to the RI if the base station does not perform JT on the user equipment at T2, for example, the RI is used as the high interference RI of the user equipment. If the CSI includes the PMI, the base station determines the low interference PMI of the user equipment according to the PMI if the base station performs JT on the user equipment at T2, for example, the PMI is used as the low interference PMI of the user equipment, or the base station determines the high interference PMI of the user equipment according to the PMI if the base station does not perform JT on the user equipment at T2, for example, the PMI is used as the high interference PMI of the user equipment. The base station distinguishes the high interference CQI, RI, and PMI and the low interference CQI, RI, and PMI. When performing JT on the user equipment, the base station performs JT scheduling on the user equipment, that is, performs the scheduling by using the low interference CQI, the low interference RI, and the low interference PMI. When performing non-JT on the user equipment, the base station performs non-JT scheduling on the user equipment, that is, performs the scheduling by using the high interference CQI, the high interference RI, and the high interference PMI, so that a CQI, an RI, and a PMI used for scheduling can more accurately match a corresponding transmission mode, a data transmission rate is improved, and further a scheduling gain during the JT is obtained.

Optionally, the base station of the serving cell updates the high interference CQI and the low interference CQI of the user equipment according to a transmission mode of data corresponding to a hybrid automatic repeat request (HARQ) feedback of the user equipment. The transmission mode is a JT transmission mode or a non-JT transmission mode. In downlink transmission performed by using an HARQ mechanism, after sending data to the user equipment, the base station receives an HARQ feedback specific to the data from the user equipment. The base station sends the data at a moment T1, and the user equipment sends or the base station receives the HARQ feedback of the data at a moment T2. There is a known time sequence relationship between T1 and T2. After the base station receives the HARQ feedback at the moment T2, the base station may determine T1 according to T2. If the base station performs JT on the user equipment at T1, the base station updates the low interference CQI of the user equipment according to the HARQ feedback. If the base station does not perform JT on the user equipment at T1, the base station updates the high interference CQI of the user equipment.

Part 607: The base station of the serving cell sends scheduling information determined in part 606 to the base station of the coordinated neighboring cell.

Part 608: The base station of the coordinated neighboring cell receives the scheduling information of the JT user equipment sent by the base station of the serving cell.

Part 609: At the JT moment, the base station of the serving cell and the base station of the coordinated neighboring cell send a same reference signal to the JT user equipment, and send data to the JT user equipment according to the scheduling information. The method is the same as that in part 509.

In comparison with the embodiment described in FIG. 5, in the JT solution described in this embodiment, an operation of performing a JT user equipment feedback by a coordinated neighboring cell is added. When a base station of a serving cell does not receive a JT user equipment feedback of the coordinated neighboring cell, or a received JT user equipment feedback indicates that user equipment indicated by a JT user equipment request is not selected as JT user equipment of the coordinated neighboring cell, the base station of the serving cell may perform non-JT scheduling on the user equipment, and does not send scheduling information of the JT user equipment to a base station of the coordinated neighboring cell, so as to reduce implementation complexity.

In this embodiment, parts 601 to 608 and part 609 may be simultaneously performed, or parts 601 to 608 may be performed before part 609. In addition, parts 601 to 608 may be performed at a same time unit, or may be performed at different time units.

In this application, a cell may be further referred to as a sector or have another name that has a same function as a function of the cell described in this application. For example, the sector is managed by a base station. The sector may have one or more user equipments. The user equipment may access to the base station and communicate with the base station.

In this application, a serving cell may have another name, for example, a first cell or any other cell that has a same feature as a feature of the serving cell described in this application. The base station provides a radio resource management function and a data transmission function for JT user equipment in the serving cell. A base station in which the cell is located may be referred to as a base station of the serving cell, or have another name, for example, a first base station or any other base station.

In this application, a coordinated neighboring cell may further have another name, for example, a second cell or any other cell that has a same feature as a feature of the coordinated neighboring cell described in this application. The base station provides a data transmission function for the JT user equipment in the coordinated neighboring cell. A base station in which the cell is located may be referred to as a base station of the coordinated neighboring cell, or have another name, for example, a second base station or any other base station.

Technical features of a function same as a function described in this application and a name different from a name described in this application fall within the protection scope of this application.

The foregoing mainly describes the technical solution provided in this application from the perspective of interaction between a network device of a serving cell and a network device of a coordinated neighboring cell. To implement each function corresponding to the foregoing processing, the network device of the serving cell and the network device of the coordinated neighboring cell include a corresponding hardware structure and/or software module, so as to implement each function in a form of hardware, software, or a combination of hardware and software. Whether a function is performed in a form of hardware, software, or a combination of hardware and software depends on particular applications and design constraint conditions of the technical solution.

Figure 7:
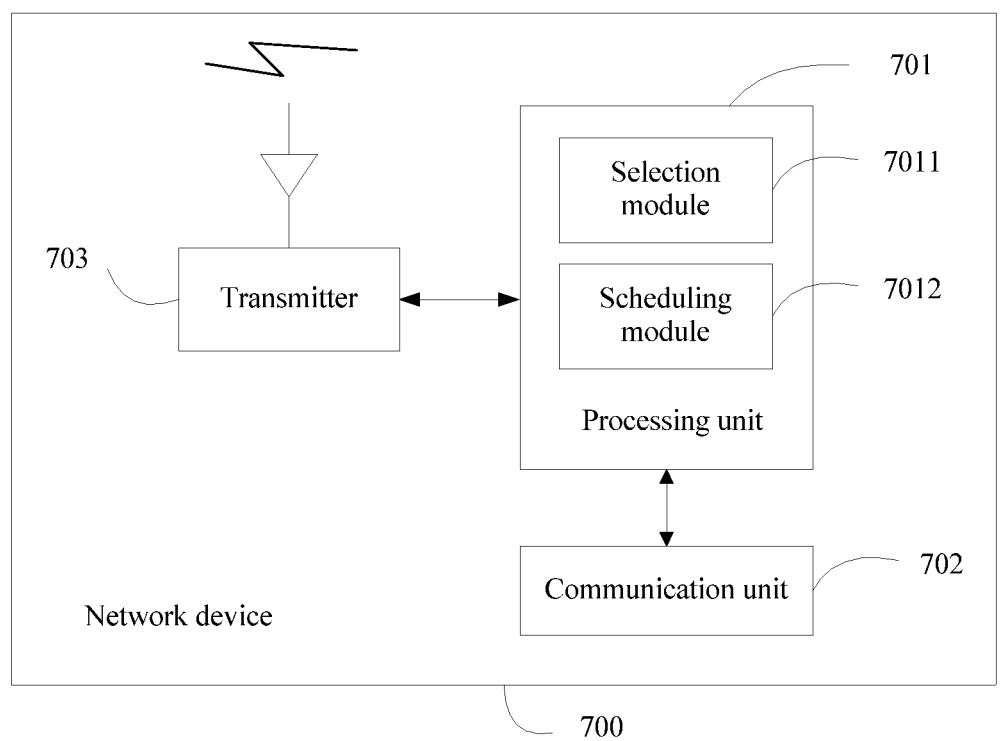
FIG. 7 is a schematic structural diagram of a network device according to an embodiment of this application.

The following describes, with reference to FIG. 7, a first possible structure of a network device of a serving cell related to the JT technical solution according to this application.

A network device 700 includes a processing unit 701, a communication unit 702, and a transmitter 703. The communication unit 702 and the transmitter 703 are separately coupled to the processing unit 701. Couplings in this application are indirect couplings or communication connections between apparatuses, units, or modules, and may be electrical, mechanical, or in another form, and are used for information exchange between the apparatuses, the units, and the modules.

The processing unit 701 includes a selection module 7011 and a scheduling module 7012. The selection module 7011 is configured to select JT user equipment and a coordinated neighboring cell of the JT user equipment for a serving cell. The scheduling module 7012 is configured to schedule the JT user equipment.

The communication unit 702 is configured to send a JT user equipment request and scheduling information of the JT user equipment to a network device of the coordinated neighboring cell. The scheduling information includes at least one of scheduling information of a data channel or scheduling information of a control channel.

The transmitter 703 is configured to send a reference signal to the JT user equipment, and send data to the JT user equipment according to the scheduling information, where the reference signal is the same as a reference signal sent by the network device of the coordinated neighboring cell of the JT user equipment to the JT user equipment, and the data includes at least one of data of the data channel or data of the control channel.

In the embodiments of this application, as described in part 509, a reference signal sent by a network device of a serving cell to JT user equipment is the same as that sent by a network device of a coordinated neighboring cell to the JT user equipment, so that reference signal overheads are reduced, and value of a JT technology is improved.

Figure 8:
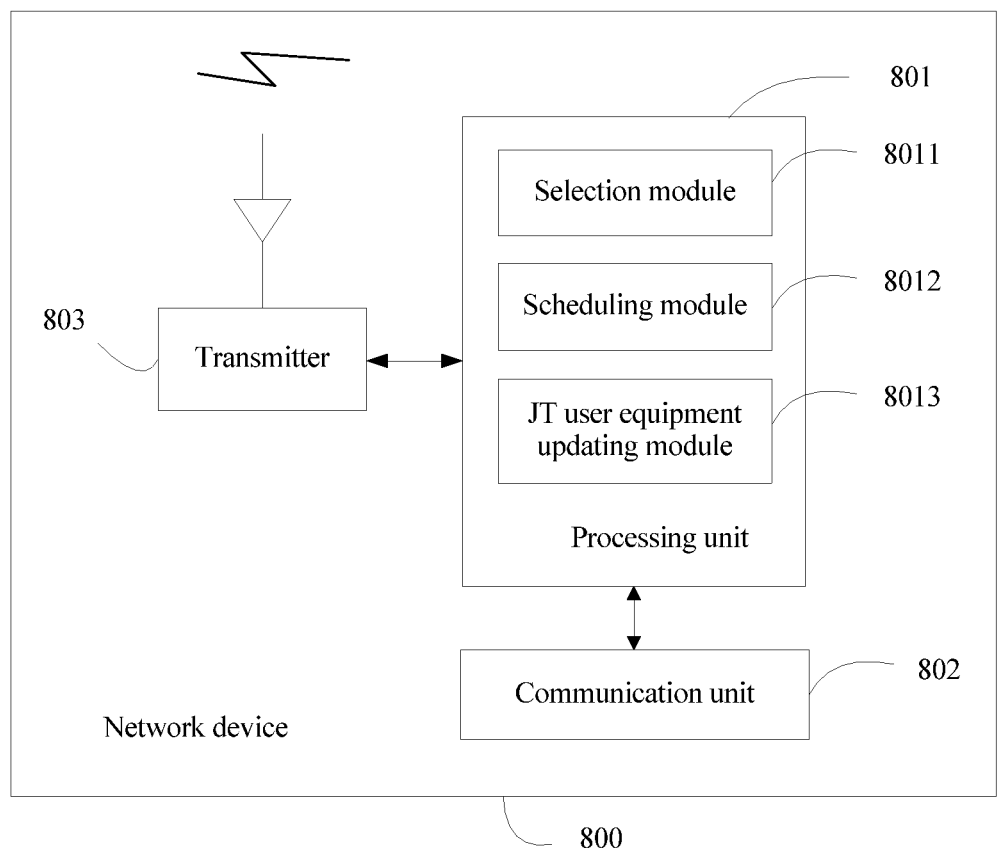
FIG. 8 is a schematic structural diagram of another network device according to an embodiment of this application.

The following describes, with reference to FIG. 8, a second possible structure of a network device of a serving cell related to the JT technical solution according to this application.

A network device 800 includes a processing unit 801, a communication unit 802, and a transmitter 803. The communication unit 802 and the transmitter 803 are separately coupled to the processing unit 801.

The transmitter 803 is the same as the transmitter 703 of the network device 700.

The communication unit 802 is configured to send a JT user equipment request and scheduling information of the JT user equipment to a network device of a coordinated neighboring cell, and receive a JT user equipment feedback sent by the network device of the coordinated neighboring cell. The scheduling information includes at least one of scheduling information of a data channel or scheduling information of a control channel. The JT user equipment feedback includes same information as that in corresponding descriptions in part 604.

The processing unit 801 includes a selection module 801, a scheduling module 8012, and a JT user equipment updating module 8013. The selection module 8011 is the same as the selection module 7011, and the scheduling module 8012 is the same as the scheduling module 7012. The JT user equipment updating module 8013 is configured to update the JT user equipment of the serving cell according to the JT user equipment feedback. An updating method is the same as that in corresponding descriptions in part 605.

Figure 9:
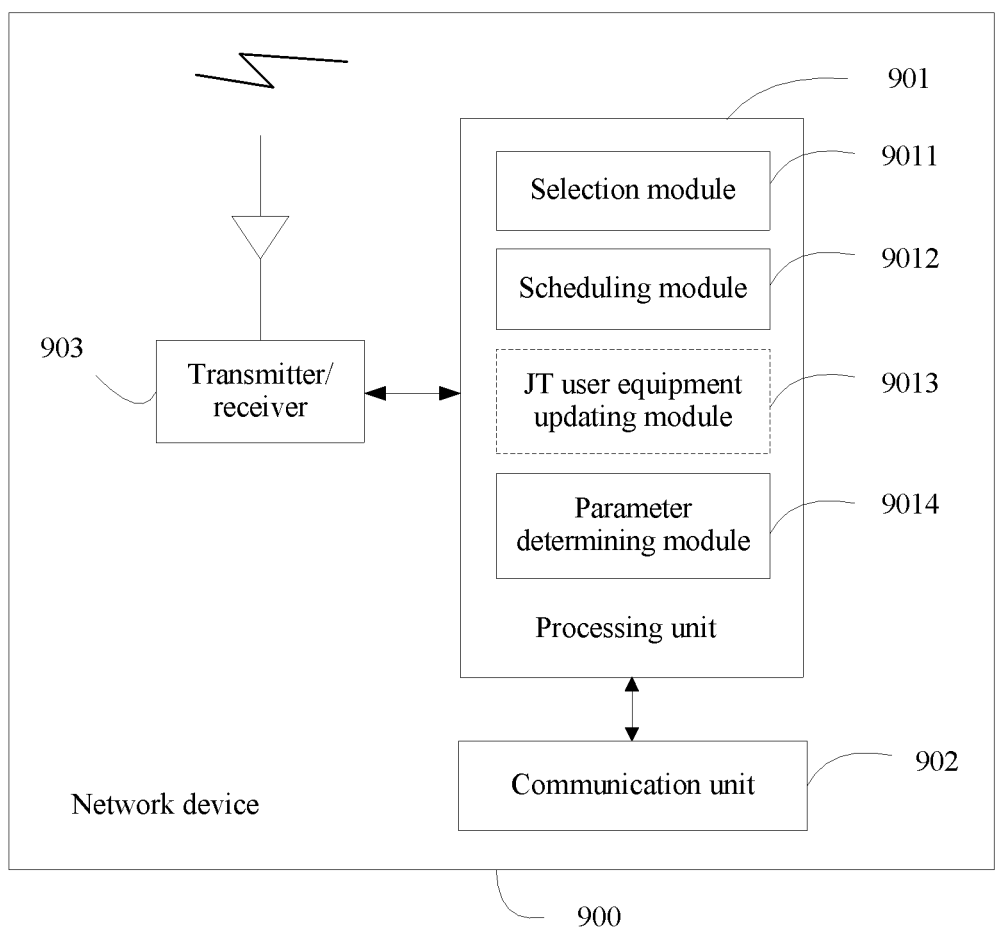
FIG. 9 is a schematic structural diagram of another network device according to an embodiment of this application.

The following describes, with reference to FIG. 9, a third possible structure of a network device of a serving cell related to the JT technical solution according to this application.

A network device 900 includes a processing unit 901, a communication unit 902, and a transmitter 903. The communication unit 902 and the transmitter 903 are separately coupled to the processing unit 901.

The processing unit 901 includes a selection module 9011, a scheduling module 9012, and a parameter determining module 9014.

The scheduling module 9012 is the same as the scheduling module of either of the network device 700 and the network device 800.

The parameter determining module 9014 includes at least one of a first parameter determining module, configured to determine an active state of a CRS disabling function of a neighboring cell, a second parameter determining module, configured to determine a CRS disabling proportion of a neighboring cell, a third parameter determining module, configured to determine a threshold B, a fourth parameter determining module, configured to determine a threshold A, or a fifth parameter determining module, configured to determine an offset A.

A method for determining a corresponding parameter by each parameter determining module is the same as that in corresponding descriptions in part 501.

The selection module 9011 is configured to select JT user equipment and a coordinated neighboring cell of the JT user equipment for the serving cell, and specifically includes at least one of a first selection module, configured to when a difference between a measurement quantity of a neighboring cell of user equipment and a measurement quantity of a serving cell of the user equipment is greater than or equal to the threshold A, respectively select the user equipment and the neighboring cell as the JT user equipment and the coordinated neighboring cell, a second selection module, configured to when a difference between a measurement quantity of a neighboring cell of user equipment and a measurement quantity of a serving cell of the user equipment is greater than or equal to a sum of the threshold A and the offset A, respectively select the user equipment and the neighboring cell as the JT user equipment and the coordinated neighboring cell, a third selection module, configured to when a CRS disabling function of a neighboring cell of a serving cell is active, respectively select user equipment of the serving cell and the neighboring cell as the JT user equipment and the coordinated neighboring cell, a fourth selection module, configured to when a difference between a measurement quantity of a neighboring cell of user equipment and a measurement quantity of a serving cell of the user equipment is greater than or equal to the threshold A, and a CRS disabling function of the neighboring cell is active, respectively select the user equipment and the neighboring cell as the JT user equipment and the coordinated neighboring cell, a fifth selection module, configured to when a difference between a measurement quantity of a neighboring cell of user equipment and a measurement quantity of a serving cell of the user equipment is greater than or equal to a sum of the threshold A and the offset A, and a CRS disabling function of the neighboring cell is active, respectively select the user equipment and the neighboring cell as the JT user equipment and the coordinated neighboring cell, a sixth selection module, configured to when a difference between a measurement quantity of a neighboring cell of user equipment and a measurement quantity of a serving cell of the user equipment is greater than or equal to the threshold A, a CRS disabling function of the neighboring cell is active, and a CRS disabling proportion of the neighboring cell is greater than or equal to the threshold B, respectively select the user equipment and the neighboring cell as the JT user equipment and the coordinated neighboring cell, or a seventh selection module, configured to when a difference between a measurement quantity of a neighboring cell of user equipment and a measurement quantity of a serving cell of the user equipment is greater than or equal to a sum of the threshold A and the offset A, a CRS disabling function of the neighboring cell is active, and a CRS disabling proportion of the neighboring cell is greater than or equal to the threshold B, respectively select the user equipment and the neighboring cell as the JT user equipment and the coordinated neighboring cell.

The communication unit 902 is the same as the communication unit of the network device 700 or the network device 800. When the communication unit 902 is the same as the communication unit 802 of the network device 800, the processing unit 901 includes a JT user equipment updating module 9013 that is the same as the JT user equipment updating module 8013 of the network device 800.

The transmitter 903 is configured to send a reference signal to the JT user equipment, and send data to the JT user equipment according to the scheduling information, where the reference signal is the same as a reference signal sent by the network device of the coordinated neighboring cell of the JT user equipment to the JT user equipment, and the data includes at least one of data of a data channel or data of a control channel. When the selection module 9011 includes the foregoing first, second, fourth, fifth, sixth, or seventh selection module, the transmitter 903 further includes a receiver that is configured to receive a measurement quantity that is of a neighboring cell and that is reported by user equipment. The method is the same as that in corresponding descriptions in part 501.

Figure 10:
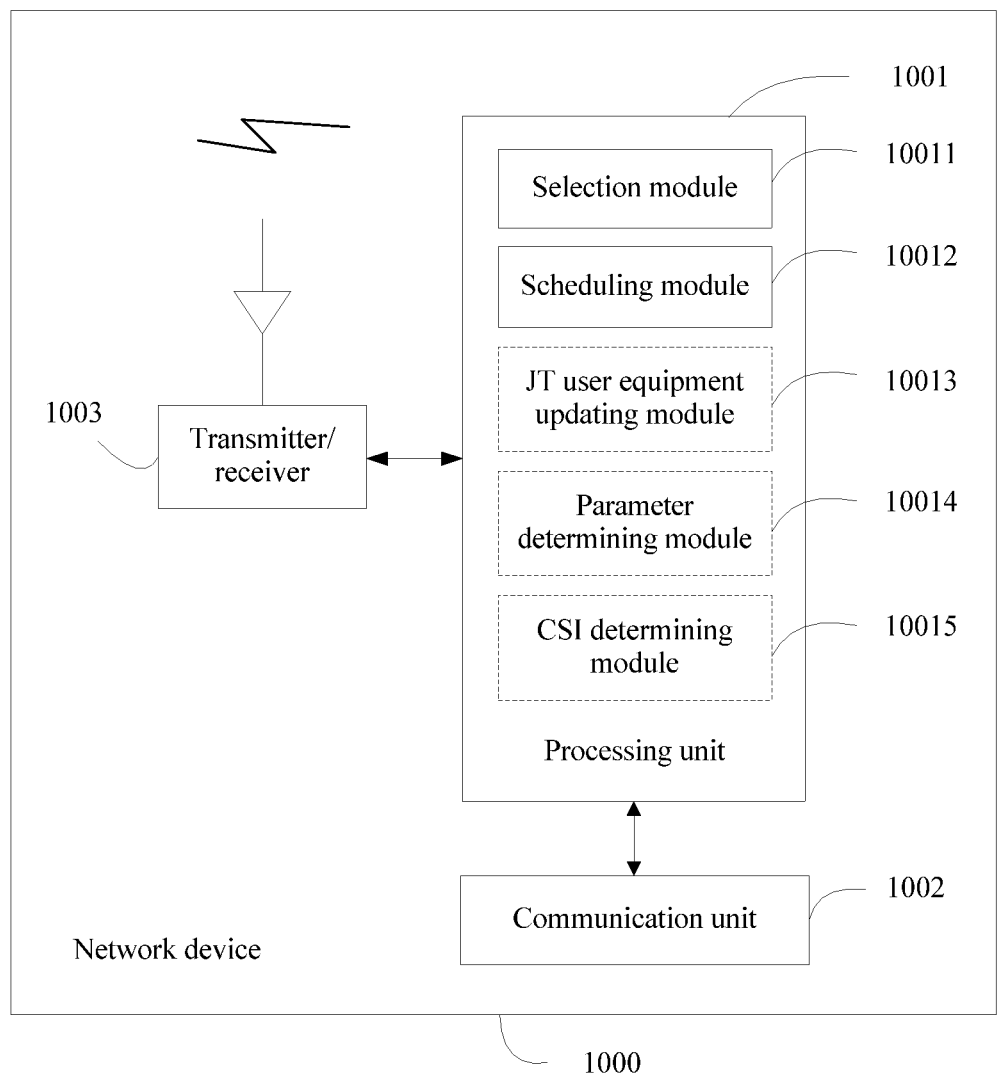
FIG. 10 is a schematic structural diagram of another network device according to an embodiment of this application.

The following describes, with reference to FIG. 10, a fourth possible structure of a network device of a serving cell related to the JT technical solution according to this application.

A network device 1000 includes a processing unit 1001, a communication unit 1002, and a transmitter 1003. The communication unit 1002 and the transmitter 1003 are separately coupled to the processing unit 1001.

The transmitter 1003 is configured to send a reference signal to the JT user equipment, and send data to the JT user equipment according to the scheduling information, where the reference signal is the same as a reference signal sent by a network device of a coordinated neighboring cell of the JT user equipment to the JT user equipment, and the data includes at least one of data of a data channel or data of a control channel.

The processing unit 1001 includes a selection module 10011 and a scheduling module 10012.

The selection module 10011 is the same as the selection module of any one of the network devices 700 to 900.

When the selection module 10011 is the same as the selection module 9011 of the network device 900, the processing unit 1001 includes a parameter determining module 10014 that is the same as the parameter determining module 9014 of the network device 900. As described in the network device 900, when the selection module 10011 includes the foregoing first, second, fourth, fifth, sixth, or seventh selection module, the transmitter 1003 includes a receiver that is configured to receive a measurement quantity that is of a neighboring cell and that is reported by user equipment.

The scheduling module 10012 is configured to schedule the JT user equipment. Specifically, the scheduling module 10012 is configured to schedule the JT user equipment according to the method described in part 506.

When the scheduling module 10012 is configured to schedule the JT user equipment according to at least one of the following: a CQI, a CQI and an RI, a CQI and a PMI, or a CQI, an RI, and a PMI, the transmitter 1003 includes a receiver that is configured to receive CSI reported by user equipment, where the CSI, the CQI, the RI, and the PMI are the same as those in corresponding descriptions in part 506.

The processing unit 1001 includes a CSI determining module 10015. If the CSI reported by the user equipment includes the CQI, the CSI determining module 10015 is configured to determine, according to the CQI, a CQI used for scheduling the user equipment. If the CSI reported by the user equipment includes the RI, the CSI determining module 10015 determines, according to the RI, an RI used for scheduling the user equipment, for example, the RI is used as the RI for scheduling the user equipment. If the CSI reported by the user equipment includes the PMI, the CSI determining module 10015 determines, according to the PMI, a PMI used for scheduling the user equipment, for example, the PMI is used as the PMI for scheduling the user equipment.

The communication unit 1002 is the same as the communication unit of any one of the network devices 700 to 900. When the communication unit 1002 is the same as the communication unit 802 of the network device 800, the processing unit 1001 includes a JT user equipment updating module 10013 that is the same as the JT user equipment updating module 8013 of the network device 800.

Figure 11:
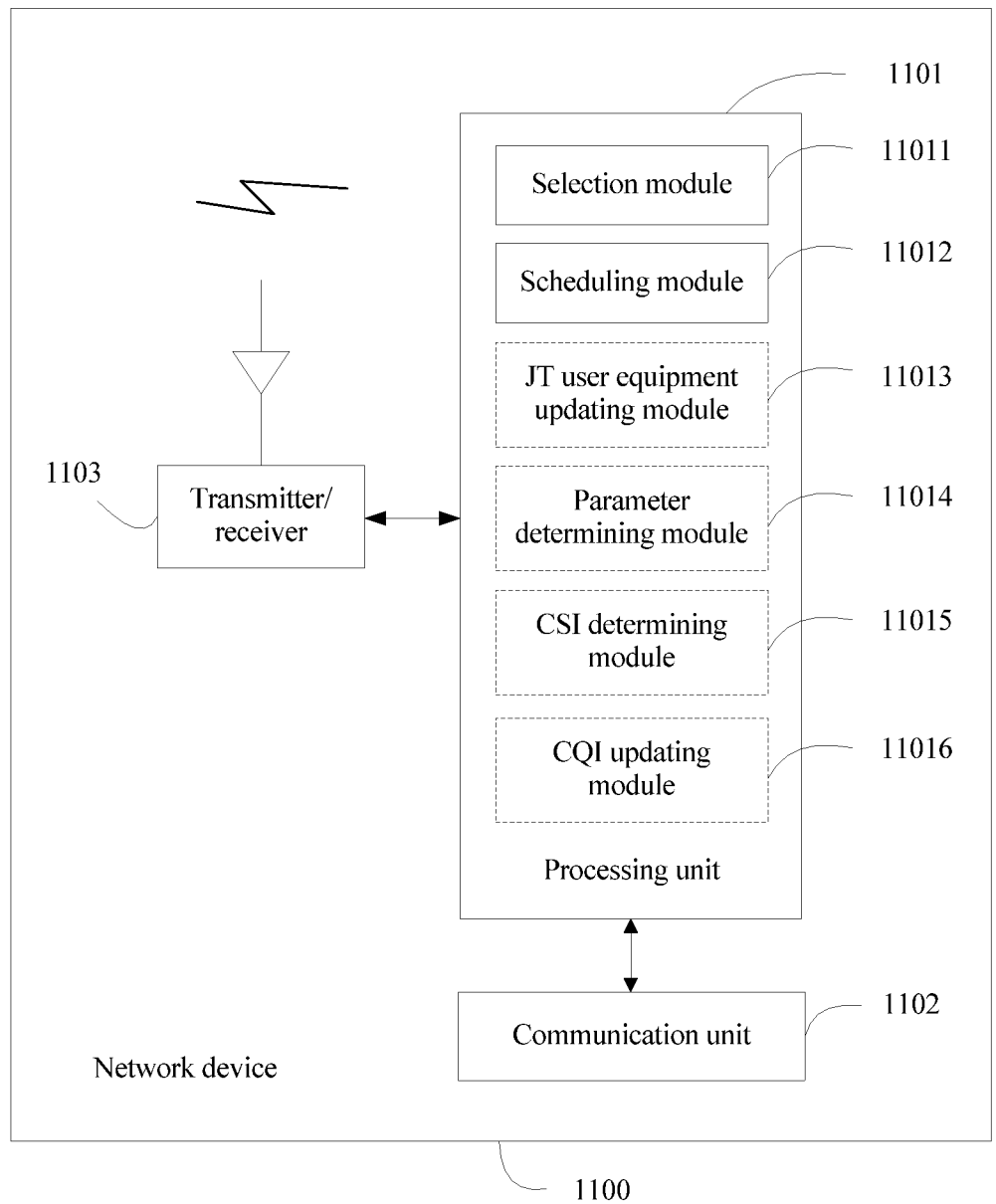
FIG. 11 is a schematic structural diagram of another network device according to an embodiment of this application.

The following describes, with reference to FIG. 11, a fifth possible structure of a network device of a serving cell related to the JT technical solution according to this application.

A network device 1100 includes a processing unit 1101, a communication unit 1102, and a transmitter 1103. The communication unit 1102 and the transmitter 1103 are separately coupled to the processing unit 1101.

The transmitter 1103 is configured to send a reference signal to the JT user equipment, and send data to the JT user equipment according to the scheduling information, where the reference signal is the same as a reference signal sent by a network device of a coordinated neighboring cell of the JT user equipment to the JT user equipment, and the data includes at least one of data of a data channel or data of a control channel.

The processing unit 1101 includes a selection module 11011 and a scheduling module 11012.

The selection module 11011 is the same as the selection module of any one of the network devices 700 to 1000.

When the selection module 11011 is the same as the selection module 9011 of the network device 900, the processing unit 1101 includes a parameter determining module 11014 that is the same as the parameter determining module 9014 of the network device 900. As described in the network device 900, when the selection module 11011 includes the foregoing first, second, fourth, fifth, sixth, or seventh selection module, the transmitter 1103 includes a receiver that is configured to receive a measurement quantity that is of a neighboring cell and that is reported by user equipment.

The scheduling module 11012 is configured to schedule the JT user equipment. Specifically, the scheduling module 11012 schedules the JT user equipment according to the method described in part 606.

When the scheduling module 11012 schedules the JT user equipment according to at least one of the following: a CQI, a CQI and an RI, a CQI and a PMI, a CQI, an RI, and a PMI, a low interference CQI, a low interference CQI and a low interference RI, a low interference CQI and a low interference PMI, or a low interference CQI, a low interference RI, and a low interference PMI, the transmitter 1103 includes a receiver that is configured to receive CSI reported by user equipment. The CSI, the CQI, the RI, the PMI, the low interference CQI, the low interference RI, and the low interference PMI are the same as those in corresponding descriptions in part 506 and part 606.

When the scheduling module 11012 schedules the JT user equipment according to at least one of the following: the CQI, the CQI and the RI, the CQI and the PMI, or the CQI, the RI, and the PMI, the processing unit 1101 includes a CSI determining module 11015 that has a same function as a function of the CSI determining module 10015 of the network device 1000.

When the scheduling module 11012 schedules the JT user equipment according to at least one of the following: the low interference CQI, the low interference CQI and the low interference RI, the low interference CQI and the low interference PMI, or the low interference CQI, the low interference RI, and the low interference PMI, the processing unit 1101 includes a CSI determining module 11015 that is configured to determine at least one group of the following: a high interference CQI and a low interference CQI, a high interference RI and a low interference RI, or a high interference PMI and a low interference PMI of user equipment. A determining method is the same as that in corresponding descriptions in part 606.

Optionally, the processing unit 1101 includes a CQI updating module 11016 that is configured to update the high interference CQI and the low interference CQI of the user equipment according to an HARQ feedback. An updating method is the same as that in corresponding descriptions in part 606.

The communication unit 1102 is the same as the communication unit of any one of the network devices 700 to 1000. When the communication unit 1102 is the same as the communication unit 802 of the network device 800, the processing unit 1101 includes a JT user equipment updating module 11013 that is the same as the JT user equipment updating module 8013 of the network device 800.

Figure 12:
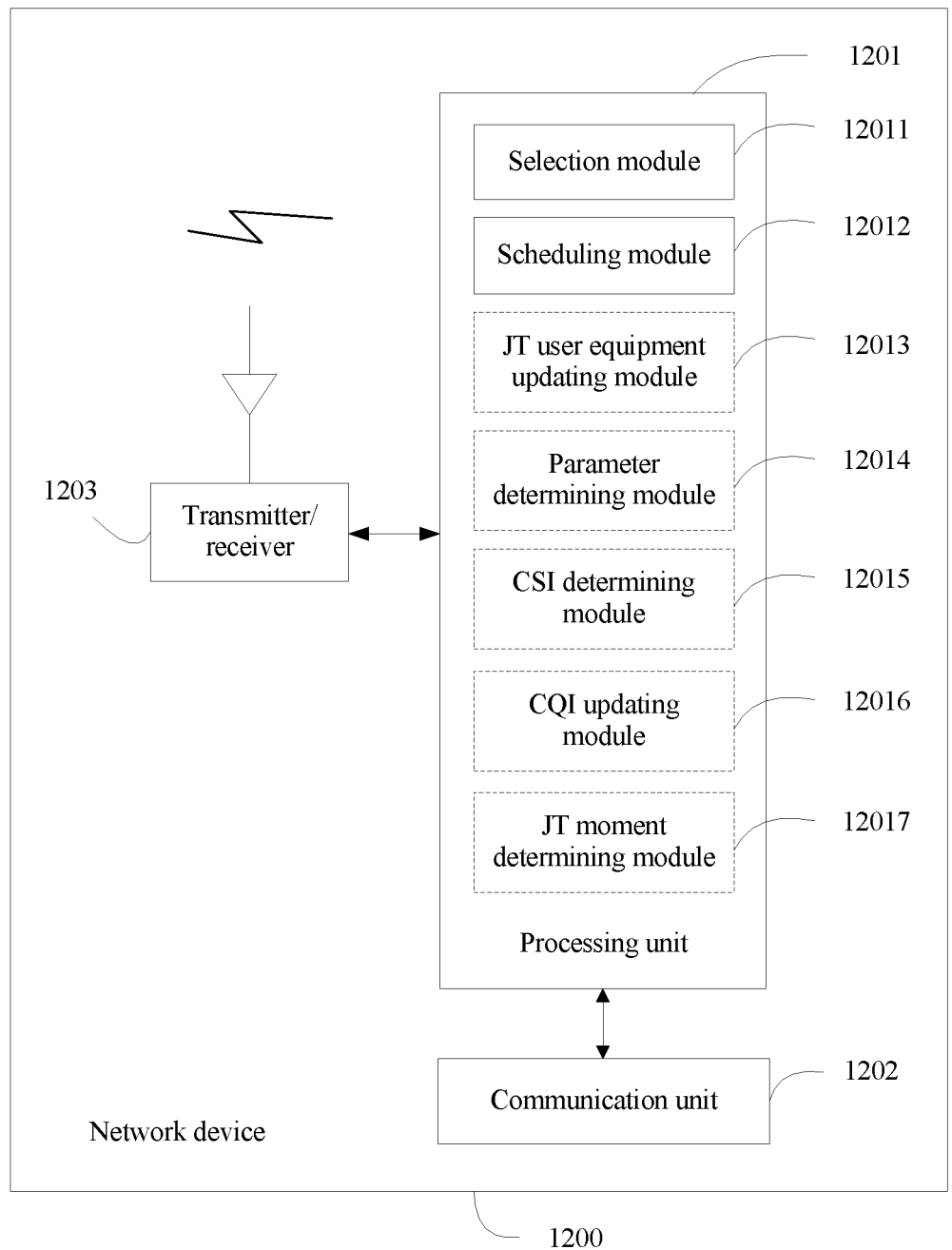
FIG. 12 is a schematic structural diagram of another network device according to an embodiment of this application.

The following describes, with reference to FIG. 12, a sixth possible structure of a network device of a serving cell related to the JT technical solution according to this application.

A network device 1200 is obtained by adding a JT moment determining module 12017 to a structure of any one of the network devices 700 to 1100, and the JT moment determining module 12017 is included in a processing unit 1201.

The network device 1200 includes the processing unit 1201, a communication unit 1202, and a transmitter 1203. The communication unit 1202 and the transmitter 1203 are separately coupled to the processing unit 1201.

The transmitter 1203 is configured to send a reference signal to the JT user equipment, and send data to the JT user equipment according to the scheduling information, where the reference signal is the same as a reference signal sent by a network device of a coordinated neighboring cell of the JT user equipment to the JT user equipment, and the data includes at least one of data of a data channel or data of a control channel.

The processing unit 1201 includes a selection module 12011 and a scheduling module 12012.

The selection module 12011 is the same as the selection module of any one of the network devices 700 to 1100.

When the selection module 12011 is the same as the selection module 9011 of the network device 900, the processing unit 1201 includes a parameter determining module 12014 that is the same as the parameter determining module 9014 of the network device 900. As described in the network device 900, when the selection module 12011 includes the foregoing first, second, fourth, fifth, sixth, or seventh selection module, the transmitter 1203 includes a receiver that is configured to receive a measurement quantity that is of a neighboring cell and that is reported by user equipment.

The scheduling module 12012 is the same as the scheduling module of any one of the network devices 700 to 1100.

When the scheduling module 12012 schedules the JT user equipment according to at least one of the following: a CQI, a CQI and an RI, a CQI and a PMI, a CQI, an RI, and a PMI, a low interference CQI, a low interference CQI and a low interference RI, a low interference CQI and a low interference PMI, or a low interference CQI, a low interference RI, and a low interference PMI, the transmitter 1203 includes a receiver that is configured to receive CSI reported by user equipment. The CSI, the CQI, the RI, the PMI, the low interference CQI, the low interference RI, and the low interference PMI are the same as those in corresponding descriptions in part 506 and part 606.

When the scheduling module 12012 schedules the JT user equipment according to at least one of the following: the CQI, the CQI and the RI, the CQI and the PMI, or the CQI, the RI, and the PMI, the processing unit 1201 includes a CSI determining module 12015 that has a same function as a function of the CSI determining module 10015 of the network device 1000.

When the scheduling module 12012 schedules the JT user equipment according to at least one of the following: the low interference CQI, the low interference CQI and the low interference RI, the low interference CQI and the low interference PMI, or the low interference CQI, the low interference RI, and the low interference PMI, the processing unit 1201 includes a CSI determining module 12015 that is configured to determine at least one group of the following: a high interference CQI and a low interference CQI, a high interference RI and a low interference RI, or a high interference PMI and a low interference PMI of user equipment. A determining method is the same as that in corresponding descriptions in part 606.

Optionally, the processing unit 1201 includes a CQI updating module 12016 that is configured to update the high interference CQI and the low interference CQI of the user equipment according to an HARQ feedback. An updating method is the same as that in descriptions in part 606.

The communication unit 1202 is configured to send a JT user equipment request and scheduling information of the JT user equipment to the network device of the coordinated neighboring cell. The scheduling information includes at least one of scheduling information of the data channel or scheduling information of the control channel. The JT user equipment request includes same information as that in content described in part 502. When the JT user equipment request includes a JT moment, a JT moment index, or a JT moment offset, the processing unit 1201 includes a JT moment determining module 12017 that is configured to determine the JT moment, the JT moment index, or the JT moment offset. A used method is the same as that in content described in part 502. The communication unit 1202 may be further configured to receive a JT user equipment feedback sent by the network device of the coordinated neighboring cell. The JT user equipment feedback includes same information as that in corresponding descriptions in part 604. When the communication unit 1202 is configured to receive the JT user equipment feedback sent by the network device of the coordinated neighboring cell, the processing unit 1201 includes a JT user equipment updating module 12013 that is the same as the JT user equipment updating module 8013 of the network device 800.

Figure 13:
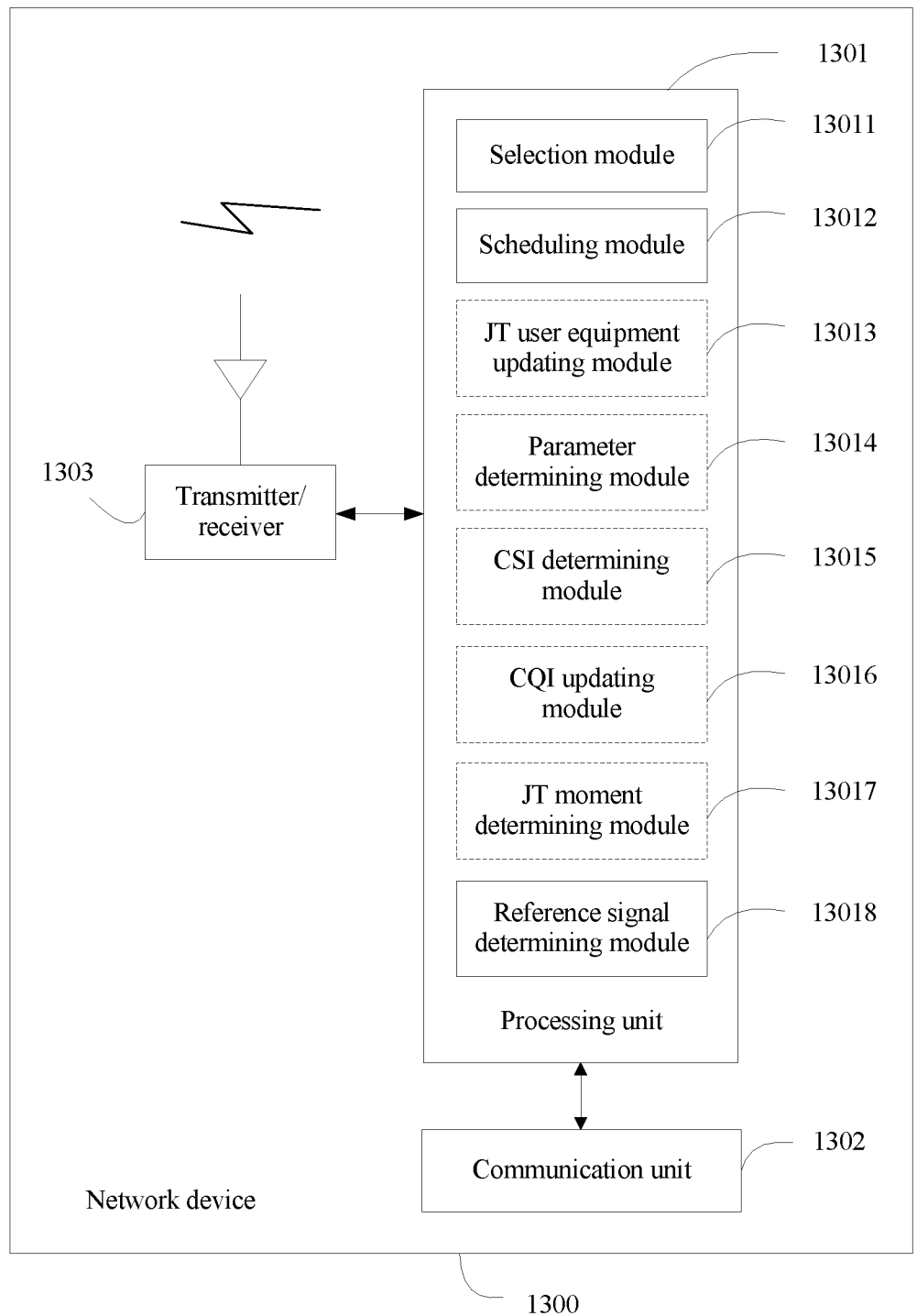
FIG. 13 is a schematic structural diagram of another network device according to an embodiment of this application.

The following describes, with reference to FIG. 13, a seventh possible structure of a network device of a serving cell related to the JT technical solution according to this application.

A network device 1300 is obtained by adding a reference signal determining module 13018 to a structure of any one of the network devices 700 to 1200, and the reference signal determining module 13018 is configured to determine information about a reference signal sent by a transmitter to the JT user equipment. Descriptions of the information are the same as descriptions in part 509. The reference signal is a serving cell CRS.

The network device 1300 includes a processing unit 1301, a communication unit 1302, and a transmitter 1303. The communication unit 1302 and the transmitter 1303 are separately coupled to the processing unit 1301.

The transmitter 1303 is configured to send a reference signal to the JT user equipment, and send data to the JT user equipment according to the scheduling information, where the reference signal is the same as a reference signal sent by a network device of a coordinated neighboring cell of the JT user equipment to the JT user equipment, and the data includes at least one of data of a data channel or data of a control channel.

The processing unit 1301 includes a selection module 13011 and a scheduling module 13012.

The selection module 13011 is the same as the selection module of any one of the network devices 700 to 1200.

When the selection module 13011 is the same as the selection module 9011 of the network device 900, the processing unit 1301 includes a parameter determining module 13014 that is the same as the parameter determining module 9014 of the network device 900. As described in the network device 900, when the selection module 13011 includes the foregoing first, second, fourth, fifth, sixth, or seventh selection module, the transmitter 1303 includes a receiver that is configured to receive a measurement quantity that is of a neighboring cell and that is reported by user equipment.

The scheduling module 13012 is the same as the scheduling module of any one of the network devices 700 to 1200.

When the scheduling module 13012 schedules the JT user equipment according to at least one of the following: a CQI, a CQI and an RI, a CQI and a PMI, a CQI, an RI, and a PMI, a low interference CQI, a low interference CQI and a low interference RI, a low interference CQI and a low interference PMI, or a low interference CQI, a low interference RI, and a low interference PMI, the transmitter 1303 includes a receiver that is configured to receive CSI reported by user equipment. The CSI, the CQI, the RI, the PMI, the low interference CQI, the low interference RI, and the low interference PMI are the same as those in corresponding descriptions in part 506 and part 606.

When the scheduling module 13012 schedules the JT user equipment according to at least one of the following: the CQI, the CQI and the RI, the CQI and the PMI, or the CQI, the RI, and the PMI, the processing unit 1301 includes a CSI determining module 13015 that has a same function as a function of the CSI determining module 10015 of the network device 1000.

When the scheduling module 13012 schedules the JT user equipment according to at least one of the following: the low interference CQI, the low interference CQI and the low interference RI, the low interference CQI and the low interference PMI, or the low interference CQI, the low interference RI, and the low interference PMI, the processing unit 1301 includes a CSI determining module 13015 that is configured to determine at least one group of the following: a high interference CQI and a low interference CQI, a high interference RI and a low interference RI, or a high interference PMI and a low interference PMI of user equipment. A determining method is the same as that in corresponding descriptions in part 606.

Optionally, the processing unit 1301 includes a CQI updating module 13016 that is configured to update the high interference CQI and the low interference CQI of the user equipment according to an HARQ feedback. An updating method is the same as that in descriptions in part 606.

The communication unit 1302 is configured to send a JT user equipment request and scheduling information of the JT user equipment to the network device of the coordinated neighboring cell. The scheduling information includes at least one of scheduling information of the data channel or scheduling information of the control channel. The JT user equipment request includes same information as that in content described in part 502. When the JT user equipment request includes a JT moment, a JT moment index, or a JT moment offset, the processing unit 1301 includes a JT moment determining module 13017 that is configured to determine the JT moment, the JT moment index, or the JT moment offset. A used method is the same as that in content described in part 502. The communication unit 1302 may be further configured to receive a JT user equipment feedback sent by the network device of the coordinated neighboring cell. The JT user equipment feedback includes same information as that in corresponding descriptions in part 604. When the communication unit 1302 is configured to receive the JT user equipment feedback sent by the network device of the coordinated neighboring cell, the processing unit 1301 includes a JT user equipment updating module 13013 that is the same as the JT user equipment updating module 8013.

Figure 14:
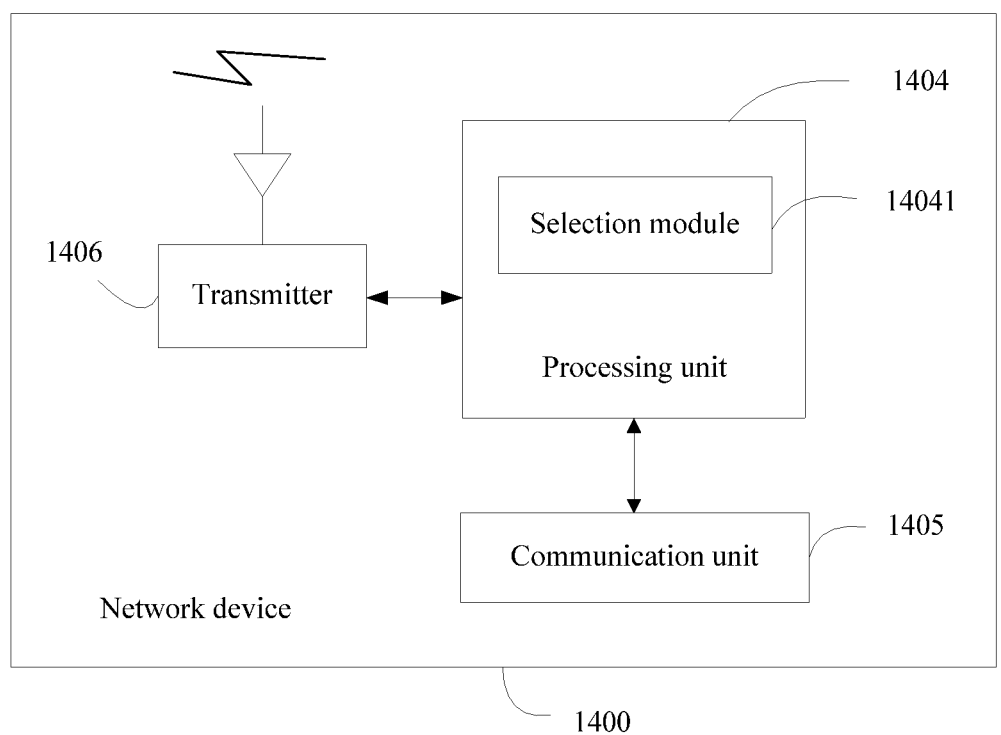
FIG. 14 is a schematic structural diagram of another network device according to an embodiment of this application.

The following describes, with reference to FIG. 14, a first possible structure of a network device of a coordinated neighboring cell related to the JT technical solution according to this application.

A network device 1400 includes a processing unit 1404, a communication unit 1405, and a transmitter 1406. The communication unit 1405 and the transmitter 1406 are separately coupled to the processing unit 1404.

The communication unit 1405 is configured to receive a JT user equipment request and scheduling information of JT user equipment sent by a network device of a serving cell. The JT user equipment request includes same information as that in descriptions in part 502, and the scheduling information is the same as that in corresponding descriptions in part 506 and part 507.

The processing unit 1404 includes a selection module 14041 that is configured to select accepted JT user equipment for the coordinated neighboring cell according to the JT user equipment request.

The transmitter 1406 is configured to send a reference signal to the JT user equipment, and send data to the JT user equipment according to the scheduling information, where the reference signal is the same as a reference signal sent by the network device of the serving cell of the JT user equipment to the JT user equipment, and the data includes at least one of data of a data channel or data of a control channel.

In this embodiment of this application, as described in part 509, a reference signal sent by a network device of a serving cell to JT user equipment is the same as that sent by a network device of a coordinated neighboring cell to the JT user equipment, so that reference signal overheads are reduced, and value of a JT technology is improved.

Figure 15:
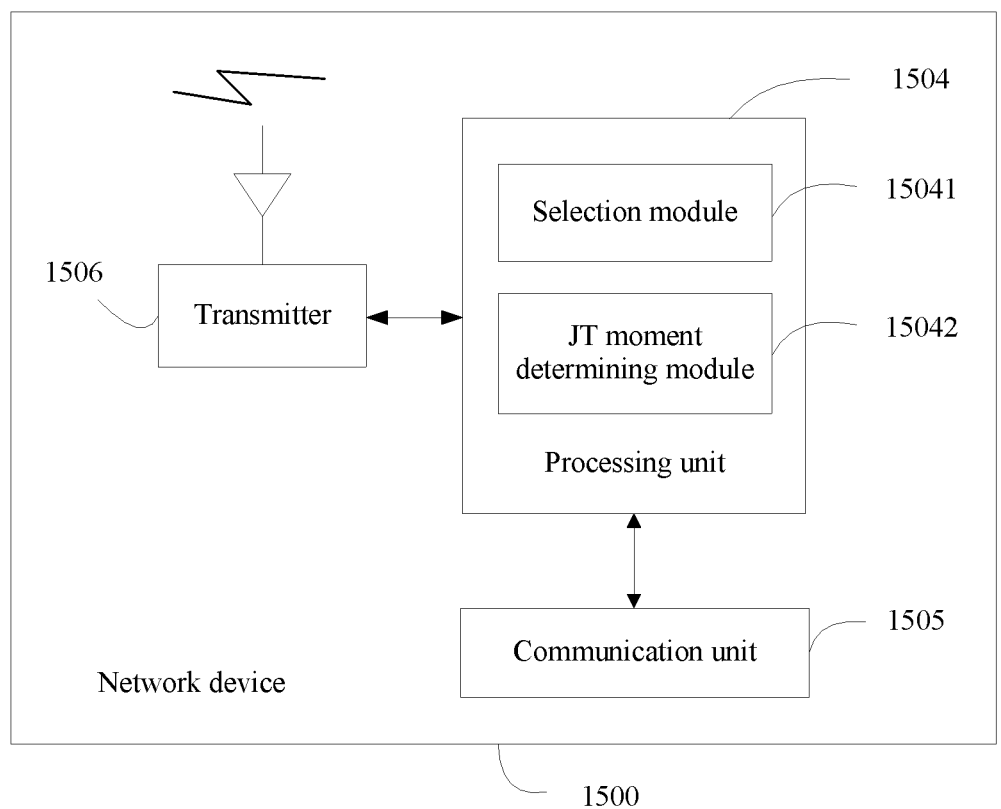
FIG. 15 is a schematic structural diagram of another network device according to an embodiment of this application.

The following describes, with reference to FIG. 15, a second possible structure of a network device of a coordinated neighboring cell related to the JT technical solution according to this application.

A network device 1500 includes a processing unit 1504, a communication unit 1505, and a transmitter 1506. The communication unit 1505 and the transmitter 1506 are separately coupled to the processing unit 1504.

The transmitter 1506 is the same as the transmitter 1406 of the network device 1400.

The communication unit 1505 is configured to receive a JT user equipment request and scheduling information of JT user equipment sent by a network device of a serving cell. The JT user equipment request indicates same information as that in descriptions in part 502, and the scheduling information is the same as that in corresponding descriptions in part 506 and part 507.

The processing unit 1504 includes a selection module 15041 and a JT moment determining module 15042.

The JT moment determining module 15042 is configured to determine a JT moment corresponding to the JT user equipment request. A specifically used method is the same as that in descriptions in part 502 and part 503.

The selection module 15041 is configured to select accepted JT user equipment for the coordinated neighboring cell according to the JT user equipment request. A specifically used method is the same as that in descriptions in part 503.

The communication unit 1505 may be further configured to receive JT user equipment requests sent by a network device to which at least two serving cells belong.

If the JT user equipment requests correspond to a same JT moment, and a coordinated neighboring cell CRS is in a disabled state at the JT moment, the selection module 15041 selects user equipments corresponding to several JT user equipment requests as the JT user equipment accepted by the coordinated neighboring cell, and ignores a JT user equipment request that is not accepted, or if the JT user equipment requests correspond to a same JT moment, the selection module 15041 accepts none of the JT user equipment requests for the coordinated neighboring cell.

Figure 16:
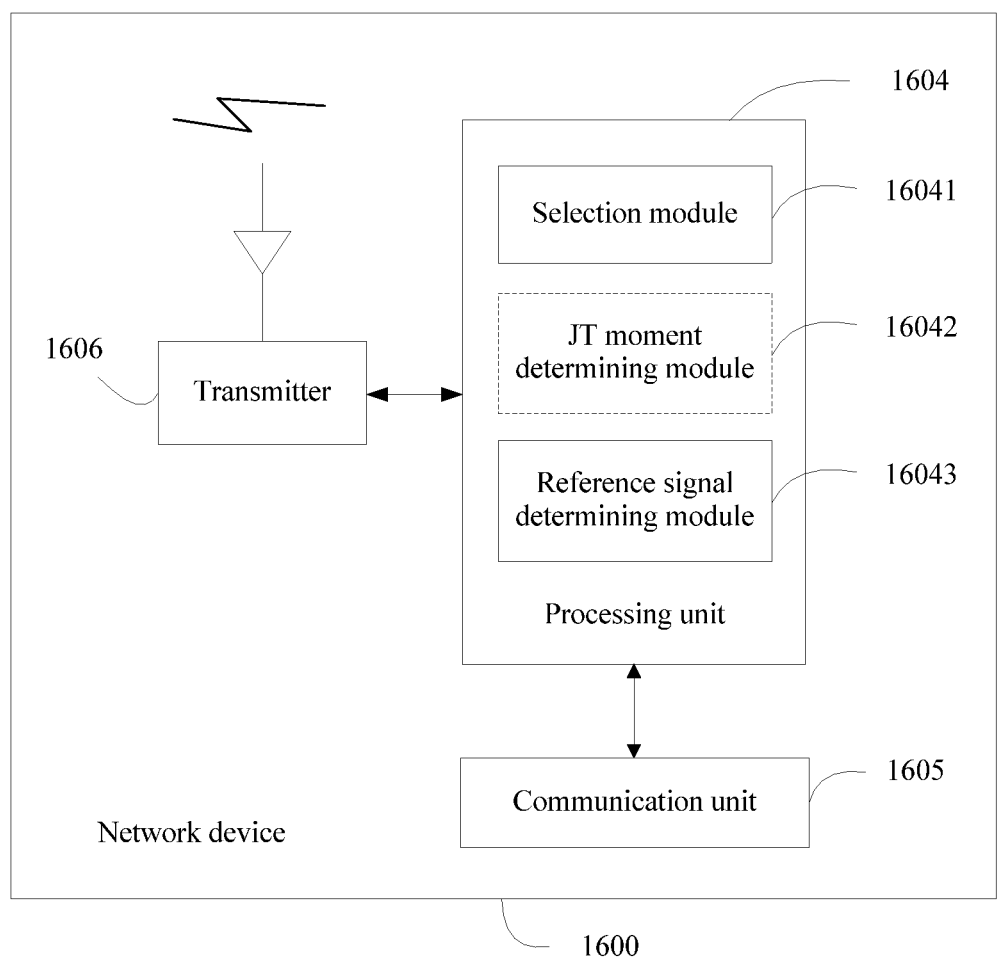
FIG. 16 is a schematic structural diagram of another network device according to an embodiment of this application.

The following describes, with reference to FIG. 16, a third possible structure of a network device of a coordinated neighboring cell related to the JT technical solution according to this application.

A network device 1600 includes a processing unit 1604, a communication unit 1605, and a transmitter 1606. The communication unit 1605 and the transmitter 1606 are separately coupled to the processing unit 1604.

The processing unit 1604 includes a selection module 16041 and a reference signal determining module 16043.

The selection module 16041 is the same as the selection module of the network device 1400 or the network device 1500. When the selection module 16041 is the same as the selection module 15041 of the network device 1500, the processing unit 1604 includes a JT moment determining module 16042 that is the same as the JT moment determining module 15042 of the network device 1500.

The reference signal determining module 16043 is configured to determine, according to a JT user equipment request, information about a reference signal sent by the transmitter 1606 to JT user equipment. The information about the reference signal is the same as that in corresponding descriptions in part 509. The JT user equipment request includes a serving cell identifier, and the reference signal is a serving cell CRS.

The transmitter 1606 is the same as the transmitter of the network device 1400 or the network device 1500.

The communication unit 1605 is the same as the communication unit of the network device 1400 or the network device 1500.

Figure 17:
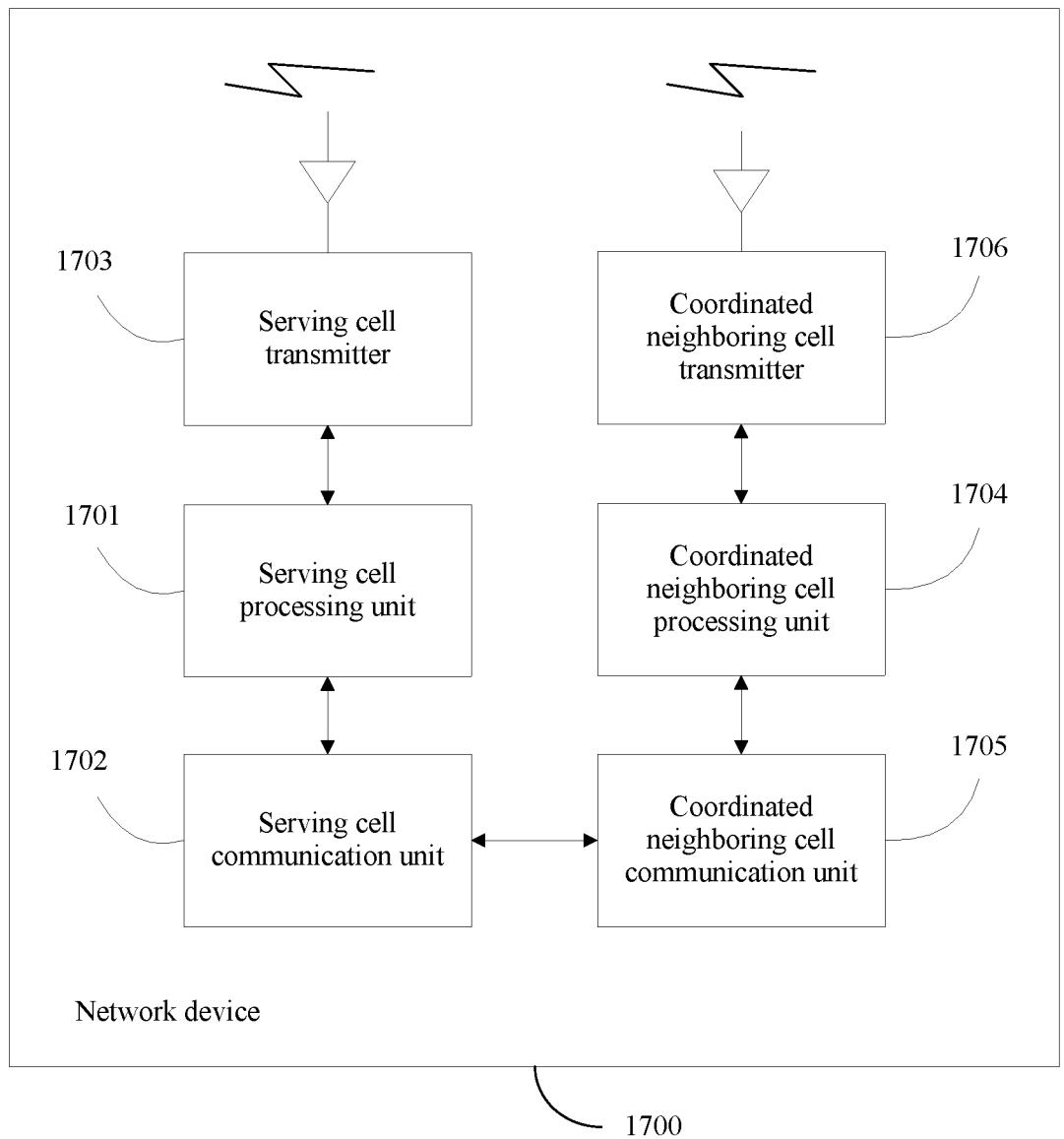
FIG. 17 is a schematic structural diagram of another network device according to an embodiment of this application.

In the JT technical solution according to this application, when a network device of a serving cell is a same network device as a network device of a coordinated neighboring cell, FIG. 17 shows a first possible structure of the same network device.

The network device 1700 includes a serving cell processing unit 1701, a serving cell communication unit 1702, a serving cell transmitter 1703, a coordinated neighboring cell processing unit 1704, a coordinated neighboring cell communication unit 1705, and a coordinated neighboring cell transmitter 1706. A coupling relationship among all modules is shown in the figure by means of line connection.

The serving cell processing unit 1701, the serving cell communication unit 1702, and the serving cell transmitter 1703 of the network device 1700 are the same as any set of the processing unit, the communication unit, and the transmitter of the first to the seventh network devices 700 to 1300 of a serving cell. For example, if the serving cell processing unit 1701 is the same as the processing unit 701 of the first network device 700 of a serving cell, the serving cell communication unit 1702 is the same as the communication unit 702 of the first network device 700 of a serving cell, and the serving cell transmitter 1703 is the same as the transmitter 703 of the first network device 700 of a serving cell.

A coordinated neighboring cell processing unit 1704, a coordinated neighboring cell communication unit 1705, and a coordinated neighboring cell transmitter 1706 of the network device 1700 are the same as any set of the processing unit, the communication unit, and the transmitter of the first to the third network devices 1400 to 1600 of a coordinated neighboring cell.

In this embodiment, information exchange between a network device of a serving cell and a network device of a coordinated neighboring cell is information exchange between the serving cell communication unit 1702 and the coordinated neighboring cell communication unit 1705. For example, the serving cell communication unit 1702 sends a JT user equipment request and scheduling information of JT user equipment to the coordinated neighboring cell communication unit 1705. In another example, the coordinated neighboring cell communication unit 1705 sends a JT user equipment feedback to the serving cell communication unit 1702. As shown in FIG. 17, the information exchange is performed between the serving cell communication unit 1702 and the coordinated neighboring cell communication unit 1705 by means of coupling between the serving cell communication unit 1702 and the coordinated neighboring cell communication unit 1705 shown in FIG. 17.

Figure 18:
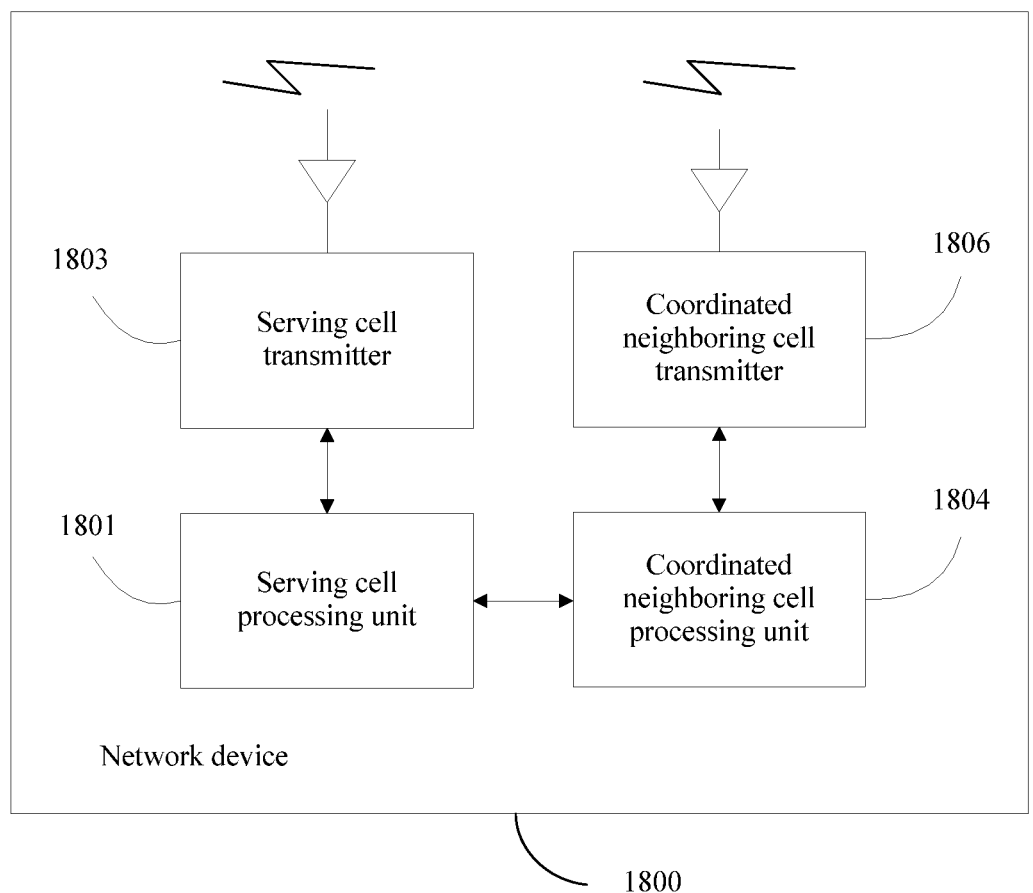
FIG. 18 is a schematic structural diagram of another network device according to an embodiment of this application.

In the JT technical solution according to this application, when a network device of a serving cell is a same network device as a network device of a coordinated neighboring cell, FIG. 18 shows a second possible structure of the same network device.

The network device 1800 is obtained by removing the serving cell communication unit 1702 and the coordinated neighboring cell communication unit 1705 from the structure of the network device 1700. The information exchange between the serving cell communication unit 1702 and the coordinated neighboring cell communication unit 1705 in the network device 1700 is implemented by a serving cell processing unit 1801 and a coordinated neighboring cell processing unit 1804 in the network device 1800 by means of information sharing. That is, the serving cell processing unit 1801 and the coordinated neighboring cell processing unit 1804 may read information from each other. For example, the serving cell processing unit may read JT user equipment accepted by the coordinated neighboring cell processing unit, or the coordinated neighboring cell processing unit may read JT user equipment that are selected by the serving cell processing unit, a corresponding JT moment, scheduling information of the JT user equipment, and the like.

In the network device 1800, a serving cell transmitter 1803 is the same as the serving cell transmitter 1703 of the network device 1700, and a coordinated neighboring cell transmitter 1806 is the same as the coordinated neighboring cell transmitter 1706 of the network device 1700.

In a network device of an apparatus embodiment of this application, a processing unit is software, hardware, or a combination of software and hardware. For example, the processing unit may be any one or any combination of a central processing unit (CPU), a general purpose processor, a network processor (NP), or a digital signal processor (DSP). The processor may further include a hardware chip. The hardware chip may be an application-specific integrated circuit (ASIC), a programmable logic device (PLD), or a combination of an ASIC and a PLD. The PLD may be any one or any combination of a complex programmable logical device (CPLD), a field programmable gate array (FPGA), or a generic array logic (GAL).

A network device in the apparatus embodiment of this application may further include a storage unit that is configured to store a program instruction, or a program instruction and data of the network device. The storage unit is software, hardware, or a combination of software and hardware. For example, the storage unit may include a volatile memory (Volatile Memory), such as a random-access memory (RAM). The memory may include a non-volatile memory (non-volatile memory), for example, a flash memory (flash memory), a hard disk drive (HDD), or a solid-state drive (SSD). The memory may further include a combination of the foregoing memories.

The apparatus embodiment described in this application shows only a simplified design of the network device. In an actual application, the network device may include any quantity of processing units, communication units, and transmitters, and may further include any quantity of memories. All network devices that can implement this application fall within the protection scope of this application.

In the apparatus embodiment of this application, module division of an apparatus is logical function division and may be another division in an actual implementation. For example, all function modules of the apparatus may be integrated into one module, or may be independent from each other, or two or more function modules may be integrated into one module.

In the apparatus embodiment of this application, a processing unit and a transmitter which are included in the foregoing network device embodiment, or a processing unit, a communication unit, and a transmitter which are included in the foregoing network device embodiment may be integrated into one network apparatus, and the network apparatus may further include a storage unit. The network apparatus also falls within the protection scope of this application. For example, the network apparatus is a chip system. The chip system may include a chip, or include a chip and another discrete device.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, a base station, a network device, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a Solid State Disk (SSD)), or the like.

The foregoing embodiments are merely intended for describing the technical solution of this application, but not for limiting the protection scope of this application. Any modifications, equivalent substitutions, improvements, and the like made on the basis of the technical solution of this application shall fall within the protection scope of this application.

What is claimed is:

1. A joint transmission (JT) method, comprising:
    selecting, by a network device of a serving cell, a JT user equipment and a coordinated neighboring cell of the JT user equipment for the serving cell;
    sending, by the network device of the serving cell, a JT user equipment request to a network device of the coordinated neighboring cell, wherein information indicated by the JT user equipment request comprises at least a serving cell identifier and a JT user equipment identifier;
    scheduling, by the network device of the serving cell, the JT user equipment and sending scheduling information to the network device of the coordinated neighboring cell; and
    sending, by the network device of the serving cell, a reference signal to the JT user equipment and sending data to the JT user equipment according to the scheduling information, wherein the reference signal sent by the network device to the JT user equipment by the network device of the serving cell is the same as a reference signal sent by the network device of the coordinated neighboring cell of the JT user equipment to the JT user equipment.

2. The method according to claim 1, wherein the method further comprises:
    receiving, by the network device of the serving cell, a JT user equipment feedback from the network device of the coordinated neighboring cell, and updating the JT user equipment of the serving cell.

3. The method according to claim 1, wherein the selecting the JT user equipment and a coordinated neighboring cell comprises performing at least one of:
    respectively selecting, in response to a difference between a measurement quantity of a neighboring cell of a user equipment and a measurement quantity of the serving cell of the user equipment being greater than or equal to a threshold A, the user equipment as the JT user equipment and the neighboring cell as the coordinated neighboring cell;
    respectively selecting, in response to a difference between a measurement quantity of a neighboring cell of a user equipment and a measurement quantity of the serving cell of the user equipment being greater than or equal to a sum of a threshold A and an offset A, the user equipment as the JT user equipment and the neighboring cell as the coordinated neighboring cell;

respectively selecting, in response to a cell-specific reference signal (CRS) disabling function of a neighboring cell of the serving cell being active, a user equipment of the serving cell and the neighboring cell as the JT user equipment and the coordinated neighboring cell;

respectively selecting, in response to a difference between a measurement quantity of a neighboring cell of user equipment and a measurement quantity of the serving cell of the user equipment being greater than or equal to a threshold A, and further in response to a CRS disabling function of the neighboring cell being active, the user equipment as the JT user equipment and the neighboring cell as the coordinated neighboring cell;

respectively selecting, in response to a difference between a measurement quantity of a neighboring cell of user equipment and a measurement quantity of the serving cell of the user equipment being greater than or equal to a sum of a threshold A and an offset A, and a CRS disabling function of the neighboring cell being active, the user equipment as the JT user equipment and the neighboring cell as the coordinated neighboring cell;

respectively selecting, in response to a difference between a measurement quantity of a neighboring cell of user equipment and a measurement quantity of the serving cell of the user equipment being greater than or equal to a threshold A, in response to a CRS disabling function of the neighboring cell being active, and further in response to a CRS disabling proportion of the neighboring cell being greater than or equal to a threshold B, the user equipment as the JT user equipment and the neighboring cell as the coordinated neighboring cell; or respectively selecting, in response to a difference between a measurement quantity of a neighboring cell of user equipment and a measurement quantity of the serving cell of the user equipment being greater than or equal to a sum of a threshold A and an offset A, in response to a CRS disabling function of the neighboring cell being active, and further in response to a CRS disabling proportion of the neighboring cell being greater than or equal to a threshold B, the user equipment as the JT user equipment and the neighboring cell as the coordinated neighboring cell.

4. The method according to claim 3, wherein the method further comprises:

determining, by the network device of the serving cell, at least one of an active state of the CRS disabling function of the neighboring cell, the CRS disabling proportion of the neighboring cell, or the threshold B, wherein the CRS disabling proportion is a proportion of a quantity of subframes in which a CRS is disabled within a time period to a total quantity of subframes in the time period.

5. The method according to claim 1, wherein the scheduling the JT user equipment comprises performing scheduling according to at least one of a predefined configuration, a network device parameter configuration, a channel quality indicator (CQI) of the user equipment, a CQI and a rank indicator (RI) of the user equipment, group including a CQI and a precoding matrix indicator (PMI) of the user equipment, a group including a CQI, an RI, and a PMI of the user equipment, a low interference CQI of the user equipment, a group including a low interference CQI and a low interference RI of the user equipment, a group including a low interference CQI and a low interference PMI of the user equipment, or a group including a low interference CQI, a low interference RI, and a low interference PMI of the user equipment; and wherein the low interference CQI of the user equipment is a low interference CQI of a high interference CQI and the low interference CQI of the user equipment, wherein the low interference RI of the user equipment is a low interference RI of a high interference RI and the low interference RI of the user equipment, and wherein the low interference PMI of the user equipment is a low interference PMI of a high interference PMI and the low interference PMI of the user equipment.

6. The method according to claim 5, wherein the method further comprises:

receiving channel state information (CSI) that is reported by the user equipment and that is received by the network device, wherein the CSI comprises at least one of the CQI, the RI, or the PMI; and performing at least one of:
performing, in response to the CSI comprising the CQI, at a moment at which the user equipment measures the CSI, at least one of:
determining, by the network device, the low interference CQI of the user equipment according to the CQI in response to a transmission mode of the user equipment being JT; or
determining, by the network device, the high interference CQI of the user equipment according to the CQI in response to the transmission mode of the user equipment being non-JT;

performing, in response to the CSI comprising the RI, at a moment at which the user equipment measures the CSI, at least one of:
determining, by the network device, the low interference RI of the user equipment according to the RI in response to the transmission mode of the user equipment being JT; or
determining, by the network device, the high interference RI of the user equipment according to the RI in response to the transmission mode of the user equipment is non-JT; or performing, in response to the CSI comprising the PMI, at a moment at which the user equipment measures the CSI, at least one of:
determining, by the network device, the low interference PMI of the user equipment according to the PMI in response to the transmission mode of the user equipment being JT, or
determining, by the network device, the high interference PMI of the user equipment according to the PMI in response to the transmission mode of the user equipment being non-JT.

7. The method according to claim 5, wherein the method further comprises:

performing at least one of:
updating, by the network device, in response to a transmission mode of the user equipment being JT at a moment at which the user equipment communicates data, the low interference CQI of the user equipment according to a hybrid automatic repeat request (HARQ) feedback of the data; or updating, by the network device, in response to the transmission mode of the user equipment being non-JT, the high interference CQI of the user equipment according to the HARQ feedback of the data.

8. The method according to claim 1, wherein the reference signal is a serving cell CRS.

9. The method according to claim 1, wherein the sending the reference signal to the JT user equipment and the sending the data to the JT user equipment comprises:
   sending the reference signal to the JT user equipment and sending the data to the JT user equipment according to the scheduling information when a coordinated neighboring cell (CRS) of the JT user equipment is disabled.

10. A joint transmission (JT) method, comprising:
    receiving, by a network device of a coordinated neighboring cell, a JT user equipment request from a network device of a serving cell and selecting an accepted JT user equipment, wherein information indicated by the JT user equipment request comprises at least a serving cell identifier and a JT user equipment identifier;
    receiving, by the network device of the coordinated neighboring cell, scheduling information of the JT user equipment from the network device of the serving cell; and
    sending, by the network device of the coordinated neighboring cell, a reference signal to the JT user equipment and sending data to the JT user equipment according to the scheduling information, wherein the reference signal sent to the JT user equipment by the network device of the coordinated neighboring cell is the same as a reference signal sent by the network device of the serving cell of the JT user equipment to the JT user equipment.

11. The method according to claim 10, wherein the method further comprises:
    sending, by the network device of the coordinated neighboring cell, a JT user equipment feedback to the network device of the serving cell.

12. The method according to claim 10, wherein the information indicated by the JT user equipment request further comprises a JT moment index.

13. The method according to claim 12, wherein the reference signal is a serving cell CRS; and
    wherein the network device of the coordinated neighboring cell determines the serving cell CRS according to the serving cell identifier.

14. The method according to claim 10, wherein the receiving the JT user equipment request from a network device of a serving cell, and selecting accepted JT user equipment comprises:
    selecting, by the network device of the coordinated neighboring cell, the accepted JT user equipment according to the JT user equipment request in response to a coordinated neighboring cell CRS being disabled at a JT moment corresponding to the JT user equipment request, wherein the JT moment is a point in time at which the network device of the serving cell requests to perform JT on the JT user equipment.

15. The method according to claim 14, wherein the selecting the accepted JT user equipment further comprises:
    receiving, by the network device of the coordinated neighboring cell, JT user equipment requests from a base station to which at least two serving cells belong and which correspond to a same JT moment; and
    performing at least one of:
    selecting the accepted JT user equipment when the coordinated neighboring cell CRS is disabled at the same JT moment and according to at least one of the JT user equipment requests; or avoiding, without checking an enabled state of the coordinated neighboring cell CRS at the same JT moment, selecting any accepted JT user equipment.

16. A network device of a serving cell, comprising:
    a communication interface;
    a transmitter;
    a processor; and
    a non-transitory computer-readable storage medium storing a program to be executed by the processor, the program including instructions to:
    select a joint transmission (JT) user equipment and a coordinated neighboring cell of the JT user equipment for the serving cell;
    cause the communication interface to send a JT user equipment request to a network device of the coordinated neighboring cell, wherein information indicated by the JT user equipment request comprises at least a serving cell identifier and a JT user equipment identifier;
    schedule the JT user equipment;
    cause the communication interface to send scheduling information to the network device of the coordinated neighboring cell; and
    cause the transmitter to send a reference signal to the JT user equipment, and to send data to the JT user equipment according to the scheduling information, wherein the reference signal is the same as a reference signal sent by the network device of the coordinated neighboring cell of the JT user equipment to the JT user equipment.

17. The network device according to claim 16, further comprising a receiver;
    wherein the program further includes instructions to:
    cause the communication interface to receive a JT user equipment feedback from the network device of the coordinated neighboring cell; and
    update the JT user equipment of the serving cell.

18. The network device according to claim 16, wherein the instructions to select the JT user equipment and a coordinated neighboring cell include instructions to:
    respectively select, in response to a difference between a measurement quantity of a neighboring cell of a user equipment and a measurement quantity of the serving cell of the user equipment being greater than or equal to a threshold A, the user equipment as the JT user equipment and the neighboring cell as the coordinated neighboring cell;
    respectively select, in response to a difference between a measurement quantity of a neighboring cell of a user equipment and a measurement quantity of the serving cell of the user equipment being greater than or equal to a sum of a threshold A and an offset A, the user equipment as the JT user equipment and the neighboring cell as the coordinated neighboring cell;
    respectively select, in response to a cell-specific reference signal (CRS) disabling function of a neighboring cell of the serving cell being active, a user equipment of the serving cell and the neighboring cell as the JT user equipment and the coordinated neighboring cell;
    respectively select, in response to a difference between a measurement quantity of a neighboring cell of user equipment and a measurement quantity of the serving cell of the user equipment being greater than or equal to a threshold A, and further in response to a CRS disabling function of the neighboring cell being active, the user equipment as the JT user equipment and the neighboring cell as the coordinated neighboring cell;

respectively select, in response to a difference between a measurement quantity of a neighboring cell of user equipment and a measurement quantity of the serving cell of the user equipment being greater than or equal to a sum of a threshold A and an offset A, and a CRS disabling function of the neighboring cell being active, the user equipment as the JT user equipment and the neighboring cell as the coordinated neighboring cell;

respectively select, in response to a difference between a measurement quantity of a neighboring cell of user equipment and a measurement quantity of the serving cell of the user equipment being greater than or equal to a threshold A, in response to a CRS disabling function of the neighboring cell being active, and further in response to a CRS disabling proportion of the neighboring cell being greater than or equal to a threshold B, the user equipment as the JT user equipment and the neighboring cell as the coordinated neighboring cell; or respectively select, in response to a difference between a measurement quantity of a neighboring cell of user equipment and a measurement quantity of the serving cell of the user equipment being greater than or equal to a sum of a threshold A and an offset A, in response to a CRS disabling function of the neighboring cell being active, and further in response to a CRS disabling proportion of the neighboring cell being greater than or equal to a threshold B, the user equipment as the JT user equipment and the neighboring cell as the coordinated neighboring cell.

19. The network device according to claim 16, wherein the program further includes instructions to perform scheduling according to at least one of a predefined configuration, a network device parameter configuration, a channel quality indicator (CQI) of the user equipment, a CQI and a rank indicator (RI) of the user equipment, a group including a CQI and a precoding matrix indicator (PMI) of the user equipment, a group including a CQI, an RI, and a PMI of the user equipment, a low interference CQI of the user equipment, a group including a low interference CQI and a low interference RI of the user equipment, a group including a low interference CQI and a low interference PMI of the user equipment, or a group including a low interference CQI, a low interference RI, and a low interference PMI of the user equipment; and wherein the low interference CQI of the user equipment is a low interference CQI of a high interference CQI and the low interference CQI of the user equipment, wherein the low interference RI of the user equipment is a low interference RI of a high interference RI and the low interference RI of the user equipment, and wherein the low interference PMI of the user equipment is a low interference PMI of a high interference PMI and the low interference PMI of the user equipment.

20. The network device according to claim 19, wherein the program further includes instructions to:

receive channel state information (CSI) that is reported by the user equipment and that is received by the network device, wherein the CSI comprises at least one of the CQI, the RI, or the PMI; and perform at least one of:
  perform, in response to the CSI comprising the CQI, at a moment at which the user equipment measures the CSI, at least one of:
    determine, by the network device, the low interference CQI of the user equipment according to the CQI in response to a transmission mode of the user equipment being JT; or
    determine, by the network device, the high interference CQI of the user equipment according to the CQI in response to the transmission mode of the user equipment being non-JT;
  perform, in response to the CSI comprising the RI, at a moment at which the user equipment measures the CSI, at least one of:
    determine, by the network device, the low interference RI of the user equipment according to the RI in response to the transmission mode of the user equipment being JT; or
    determine, by the network device, the high interference RI of the user equipment according to the RI in response to the transmission mode of the user equipment is non-JT; or
  perform, in response to the CSI comprising the PMI, at a moment at which the user equipment measures the CSI, at least one of:
    determine, by the network device, the low interference PMI of the user equipment according to the PMI in response to the transmission mode of the user equipment being JT, or
    determine, by the network device, the high interference PMI of the user equipment according to the PMI in response to the transmission mode of the user equipment being non-JT.

* * * * *